United States Patent
Doser et al.

(10) Patent No.: US 9,014,533 B2
(45) Date of Patent: Apr. 21, 2015

(54) METHOD AND SYSTEM FOR LOOK DATA DEFINITION AND TRANSMISSION OVER A HIGH DEFINITION MULTIMEDIA INTERFACE

(75) Inventors: Ingo Tobias Doser, Villingen-Schwenningen (DE); Rainer Zwing, VS-Villingen (DE); Wolfgang Endress, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 579 days.

(21) Appl. No.: 12/735,590

(22) PCT Filed: Jan. 31, 2008

(86) PCT No.: PCT/IB2008/000223
§ 371 (c)(1),
(2), (4) Date: Nov. 13, 2010

(87) PCT Pub. No.: WO2009/095732
PCT Pub. Date: Aug. 6, 2009

(65) Prior Publication Data
US 2011/0064373 A1    Mar. 17, 2011

(51) Int. Cl.
*H04N 5/93*   (2006.01)
*G11B 27/30*   (2006.01)
(Continued)

(52) U.S. Cl.
CPC .......... *G11B 27/3027* (2013.01); *G11B 27/031* (2013.01); *G11B 27/3063* (2013.01);
(Continued)

(58) Field of Classification Search
CPC ......... H04N 7/025; H04N 7/08; H04N 9/641; H04N 9/67; H04N 13/0062; H04N 13/0066; H04N 13/0048; H04N 21/235; H04N 21/84; G11B 27/3063; G11B 27/3027; G11B 27/031
USPC ................... 345/603; 348/500, 554; 382/167; 386/239, 201, 278; 725/110, 118
See application file for complete search history.

(56) References Cited

U.S. PATENT DOCUMENTS 5,373,327 A    12/1994   McGee et al.
5,838,318 A    11/1998   Porter et al.
(Continued)

FOREIGN PATENT DOCUMENTS

EP    1838083         9/2007
EP    1838083 A1 *    9/2007
(Continued)

OTHER PUBLICATIONS

Vetter, "Data Encoding Protocol Using Key-Length-Value", Proposed SMPTE Standard 336M, MPEG00/5926, Jan. 2000, 30 pages.
(Continued)

*Primary Examiner* — Thai Tran
*Assistant Examiner* — Stephen Smith
(74) *Attorney, Agent, or Firm* — Robert D. Shedd; Jorge Tony Villabon

(57) ABSTRACT

A method and system are provided for look data definition and transmission over a high definition multi-media interface (HDMI). The method includes generating metadata for video content. The metadata is used for altering the video content before display thereof by accounting for variations between different display devices and variations between different creative intents by a content creator. The method further includes preparing the video content and the metadata for transmission over a high definition multimedia interface.

28 Claims, 28 Drawing Sheets

(51) Int. Cl.

| | | |
|---|---|---|
| *G11B 27/031* | (2006.01) | |
| *G11B 27/34* | (2006.01) | |
| *H04N 9/64* | (2006.01) | |
| *H04N 9/67* | (2006.01) | |
| *H04N 21/235* | (2011.01) | |
| *H04N 21/41* | (2011.01) | |
| *H04N 21/435* | (2011.01) | |
| *H04N 21/84* | (2011.01) | |

(52) U.S. Cl.
CPC ............... *G11B27/34* (2013.01); *H04N 9/641* (2013.01); *H04N 9/67* (2013.01); *H04N 21/235* (2013.01); *H04N 21/4122* (2013.01); *H04N 21/435* (2013.01); *H04N 21/84* (2013.01)

(56) References Cited

U.S. PATENT DOCUMENTS

| | | | | |
|---|---|---|---|---|
| 6,043,909 | A * | 3/2000 | Holub | 358/504 |
| 6,067,070 | A | 5/2000 | Suzuki et al. | |
| 7,053,927 | B2 | 5/2006 | Jones et al. | |
| 7,092,742 | B2 | 8/2006 | Rytivaara et al. | |
| 7,583,355 | B2 * | 9/2009 | Bogdanowicz et al. | 352/38 |
| 7,822,270 | B2 * | 10/2010 | Van Hoof et al. | 382/167 |
| 2003/0053683 | A1 * | 3/2003 | Newman et al. | 382/162 |
| 2004/0006575 | A1 * | 1/2004 | Visharam et al. | 707/104.1 |
| 2004/0113933 | A1 | 6/2004 | Guler | |
| 2005/0146735 | A1 * | 7/2005 | Ternasky et al. | 358/1.9 |
| 2005/0280853 | A1 * | 12/2005 | Newman et al. | 358/1.9 |
| 2006/0110031 | A1 * | 5/2006 | Bala et al. | 382/162 |
| 2006/0280360 | A1 * | 12/2006 | Holub | 382/162 |
| 2006/0291569 | A1 * | 12/2006 | Kabuto et al. | 375/240.25 |
| 2007/0022464 | A1 * | 1/2007 | Dean | 725/136 |
| 2007/0268411 | A1 * | 11/2007 | Rehm et al. | 348/650 |
| 2007/0291179 | A1 * | 12/2007 | Sterling et al. | 348/642 |
| 2008/0172708 | A1 * | 7/2008 | Perry et al. | 725/110 |
| 2008/0266459 | A1 * | 10/2008 | Butterworth | 348/649 |
| 2008/0288995 | A1 * | 11/2008 | Diab et al. | 725/118 |
| 2009/0147021 | A1 * | 6/2009 | Glen | 345/603 |
| 2009/0161017 | A1 * | 6/2009 | Glen | 348/624 |
| 2009/0178097 | A1 * | 7/2009 | Kim et al. | 725/114 |
| 2009/0278984 | A1 * | 11/2009 | Suzuki et al. | 348/554 |
| 2010/0033627 | A1 * | 2/2010 | Hayashi et al. | 348/500 |
| 2011/0013833 | A1 * | 1/2011 | Hoof et al. | 382/167 |

FOREIGN PATENT DOCUMENTS

| | | | |
|---|---|---|---|
| WO | WO 2006/039357 | * | 4/2006 |
| WO | WO2006039357 | | 4/2006 |
| WO | 2007/111843 A1 | | 10/2007 |
| WO | WO 2007132877 A1 | * | 11/2007 |

OTHER PUBLICATIONS

"High-Definition Multimedia Interface", Specificatioin Version 1.3, Internet Citation, URL: http://www.hdmi.org/download/HDMI_Spec_1.3_GMI.pdf, Jun. 22, 2006.

Vetter, "SMPTE Key-Length-Value (KLV) Protocol for Data Encoding", Video Standards and Drafts, ISO/IEC JTC1/SC29/WG11, MPEG99/M5038, Melbourn, Australia, Sep. 1999.

Wilkinson, "The SMPTE Data Coding Protocol and Dictionaries", SMPTE Journal, vol. 109, No. 7, Scarsdale, NY, Jul. 1, 2000, pp. 579-586.

(International Search Report Dated: Sep. 18, 2008).

\* cited by examiner

| Name | Description | Value |
|---|---|---|
| Tag ID | ID of 3D-LUT data 8 bit | 0x11 |
| Value | Data Valid Yes/No | BOOL |
| | Color Space: Defines the color space | [00] = RGB<br>[01] = XYZ<br>[10] = YCrCb<br>[11] = reserved |
| | Length: Length of payload in Bytes. Assumed is 8 bit node data. | |
| | Values: LUT node data: Regulary spaced input data assumed. First word RED, CIE_X, or Y. Second word is GREEN, CIE_Y, or Cr. Third word is BLUE, CIE_Z, or Cb.<br><br>Lattice scan: BLUE changes first, then Green, then RED. | |

FIG. 8

| Name | Description | Value |
|---|---|---|
| Tag ID | ID of 3D-LUT data 10 bit | 0x12 |
| Value | Data Valid Yes/No | BOOL |
| | Color Space: Defines the color space | [00] = RGB<br>[01] = XYZ<br>[10] = YCrCb<br>[11] = reserved |
| | Length of payload in Bytes. Assumed is 10 bit node data, packed into one 32 bit word. | |
| | Values: LUT node data: Regulary spaced input data assumed. First word RED, CIE_X, or Y. Second word is GREEN, CIE_Y, or Cr. Third word is BLUE, CIE_Z, or Cb.<br><br>Lattice scan: BLUE changes first, then Green, then RED. | Word = RED << 20<br>+ GREEN << 10<br>+ BLUE |

FIG. 9

| Name | Description | Value |
|---|---|---|
| Tag ID | ID of 1D-LUT data 8 bit | 0x13 |
| Value | Data Valid Yes/No | BOOL |
| | Color: Defines the color, whether it is a LUT for the RED channel, the GREEN channel, or the BLUE channel, or whether it is to be applied to all channels. | [00] = RED or CIE_X or Y<br>[01] = GREEN or CIE_Y or Cr<br>[10] = BLUE or CIE_Z or Cb<br>[11] = All Channels |
| | Values: LUT output data: Expected are 256 8-bit values, starting with the output value for the smallest input value. | |

FIG. 10

| Name | Description | Value |
|---|---|---|
| Tag ID | ID of 3D-LUT data 10 bit | 0x14 |
| Value | Data Valid Yes/No | BOOL |
| | Color: Defines the color, whether it is a LUT for the RED channel, the GREEN channel, or the BLUE channel, or whether it is to be applied to all channels. | [00] = RED or CIE_X or Y<br>[01] = GREEN or CIE_Y or Cr<br>[10] = BLUE or CIE_Z or Cb<br>[11] = All Channels |
| | Values: LUT output data: Expected are 1024 10-bit values, starting with the output value for the smallest input value. Packetized are 3 10 bit values into one 32 bit word. | Word = LUT[0] << 20 +<br>LUT[1] << 10<br>+ LUT[2] |

FIG. 11

| Name | Description | Value |
|---|---|---|
| Tag ID | ID of 3x3 Matrix 10 bit | 0x15 |
| Value | Data Valid Yes/No | BOOL |
| | Color: Defines Matrix Application | [00] = RGB to RGB (gamma)<br>[01] = RGB to RGB (linear)<br>[11] = XYZ to XYZ |
| | Coefficient values: Expected are 9 10-bit values, of the form:<br><br>[ B1       [ C1 C2 C3       [ A1<br>  B2   =   C4 C5 C6   x   A2<br>  B3 ]     C7 C8 C9 ]     A3 ]<br><br>Where A1 and B1 is Red or CIE_X, A2 and B2 is Green or CIE_Y, A3 and B3 is Blue or CIE_Z. The sequence of order is C1 - C2 - C3<br><br>…<br>Three coefficients are packed into one 32 bit word, so that the total payload is 3x32 bit = 96 bit. | Word = C1 << 20<br>+ C2 << 10<br>+ C3 |

FIG. 12

| Name | Description | Value |
|---|---|---|
| Tag ID | ID of 3x3 Matrix 8 bit | 0x16 |
| Value | Data Valid Yes/No | BOOL |
| | Color: Defines Matrix Application | [00] = RGB to RGB (gamma)<br>[01] = RGB to RGB (linear)<br>[11] = XYZ to XYZ |
| | Coefficient values: Expected are 9 8-bit values, of the form:<br><br>$\begin{bmatrix} B1 \\ B2 \\ B3 \end{bmatrix} = \begin{bmatrix} C1 & C2 & C3 \\ C4 & C5 & C6 \\ C7 & C8 & C9 \end{bmatrix} \times \begin{bmatrix} A1 \\ A2 \\ A3 \end{bmatrix}$<br><br>Where A1 and B1 is Red or CIE_X, A2 and B2 is Green or CIE_Y, A3 and B3 is Blue or CIE_Z. | The sequence of order is C1 - C2 - C3 ...<br>The total payload is 9x8 bit = 72 bit |

FIG. 13

| Name | Description | Value |
|---|---|---|
| Tag ID | ID of 3x3 Matrix 16 bit | 0x17 |
| Value | Data Valid Yes/No | BOOL |
| | Color: Defines Matrix Application | [00] = RGB to RGB (gamma)<br>[01] = RGB to RGB (linear)<br>[11] = XYZ to XYZ |
| | Coefficient values: Expected are 9 16-bit values, of the form:<br><br>$\begin{bmatrix} B1 \\ B2 \\ B3 \end{bmatrix} = \begin{bmatrix} C1 & C2 & C3 \\ C4 & C5 & C6 \\ C7 & C8 & C9 \end{bmatrix} \times \begin{bmatrix} A1 \\ A2 \\ A3 \end{bmatrix}$<br><br>Where A1 and B1 is Red or CIE_X, A2 and B2 is Green or CIE_Y, A3 and B3 is Blue or CIE_Z. | The sequence of order is C1 - C2 - C3 ...<br>The total payload is 9x16 bit = 144 bit |

FIG. 14

| Name | Description | Value |
|---|---|---|
| Tag ID | ID Video Frequency Equalizer 8 bit | 0x21 |
| Value | Number of coefficients for Frequency Equalizer | Up to 16 : 4 bit |
| | Coefficients: Every coefficient controls one frequency band multiplier. | C1-C2-C3-... |

FIG. 17

| Name | Description | Value |
|---|---|---|
| Tag ID | ID Motion Behavior | 0x31 |
| Value | Input Frame Rate in Hz | U8 |
| | Field Repetition | U8 |
| | Desired Display behavior 0...328% | U16 |
| | Preprocessing Yes/No | BOOL |
| | Motion Estimation Yes/No | BOOL |
| | Eye Motion Trajectory (x/y) | 2 x U32 |

| Name | Description | Value |
|---|---|---|
| Tag ID | ID Film Grain (Thomson FGT) | 0x41 |
| Value | cancel flag: 0=FG, 1=no FG | |
| | model: 0=DCT, 1=AR | |
| | color description present flag | |
| | blending mode: 0=add, 1=mult | |
| | log2scale factor | |
| | component 0 param present flag | |
| | component 1 param present flag | |
| | component 2 param present flag | |
| | nb of intensity intervals minus 1 | |
| | nb of param minus 1 | |
| | Params [luma_range_intensity] film_grain_intensity film_grain_size | [ 0  50]  60  8<br>[ 51  60] 110  8<br>[ 61  80] 145  8<br>[ 81 100] 220  8<br>[101 150] 225  8<br>[151 180] 190  8<br>[181 255] 150  8 |
| | film grain repetition period | |

FIG. 19

| Name | Description | Value |
|---|---|---|
| Tag ID | ID Noise | 0x42 |
| Value | Color Space: Defines the color space | [00] = RGB<br>[01] = XYZ<br>[10] = YCrCb<br>[11] = reserved |
| | Channel | [00] = RED or CIE_X or Y<br>[01] = GREEN or CIE_Y or Cr<br>[10] = BLUE or CIE_Z or Cb<br>[11] = All Channels |
| | Level | U8 |
| | Number coefficients, if 0, then White Noise | U8 |
| | Coefficient Values, equally spaced frequency distribution including 0 and Nyquist, lowest frequency first. Minimum 2 coefficients, except if Number Coefficients = 0. | Number Coefficients X U8, lowest frequency coefficient first |
| | Nb Luma Dependency | |
| | Luma Dependency<br><br>[luma_range_intensity] noise_intensity | [ 0 50] 60<br>[ 51 60] 110<br>[ 61 80] 145<br>[ 81 100] 220<br>[101 150] 225<br>[151 180] 190<br>[181 255] 150 |

FIG. 20

| Name | Description | Value |
|---|---|---|
| Tag ID | ID Time Editing | 0x61 |
| Value | Number of time codes: Number of pairs of In and Out time codes | 0...255 |
| | Format is HH:MM:SS:FF<br><br>HH = hours, up to 99<br>MM = minutes, 0 to 59,<br>SS = seconds, 0 to 59,<br>FF = frame, 0 to 23 in case of 24 fps<br>0 to 24 in case of 25 fps<br>0 to 49 in case of 49 fps<br>0 to 59 in case of 59 fps | 4 bytes per time code, 8 bytes per time code pair. |

FIG. 21

| Name | Description | Value |
|---|---|---|
| Tag ID | ID Tone Mapping | 0x51 |
| Value | Coded bit depth | U8 |
| | Output bit depth | U8 |
| | Model ID | U8 |
| | Number Model Parameters | U8 |
| | Model Parameters | Number Model Parameters x U8 |

FIG. 22

| Packet Byte # | 7 | 6 | 5 | 4 | 3 | 2 | 1 | 0 |
|---|---|---|---|---|---|---|---|---|
| PB0 | GBD_Length_H ||||||||
| PB1 | GBD_Length_L ||||||||
| PB2 | Checksum ||||||||
| PB3-PB27 | GBD bytes 0 through 24 ||||||||

FIG. 23

| Byte\Bit # | 7 | 6 | 5 | 4 | 3 | 2 | 1 | 0 |
|---|---|---|---|---|---|---|---|---|
| HB0 | 0 | 0 | 0 | 0 | 1 | 0 | 1 | 0 |
| HB1 | Next_Field | GBD_profile ||| Affected_Gamut_Seq_Num |||
| HB2 | No_Cmt_GBD | Rsvd (0) | Packet_Seq || Current_Gamut_Seq_Num |||

FIG. 24

| Byte\Bit | 7 | 6 | 5 | 4 | 3 | 2 | 1 | 0 |
|---|---|---|---|---|---|---|---|---|
| HB0 | \multicolumn{8}{c|}{LPD_Length_H} |
| HB1 | LPD_Length_L ||||||||
| HB2 | Checksum ||||||||
| HB3 | 0 | 0 | 0 | 0 | 1 | 0 | 1 | 0 |
| HB4 | Next_Field | LPD_profile ||| Affected_LPD_Num ||||
| HB5 | No_Crrt_LPD | Rsvd (0) | Packet_Seq || Current_LPD_Seq_Num ||||

FIG. 26

| Byte # | Field Name | Contents |
|---|---|---|
| n | Vendor Specific InfoFrame Type Code | $01_{16}$ |
| n+1 | Vendor Specific InfoFrame Version | $01_{16}$ |
| n+2 | Lv InfoFrame Length | Total Number of bytes in InfoFrame Payload including IEEE Registration ID |
| n+3,4,5 | 24 bit IEEE Registration Identifier | 24 bit IEEE Registration ID (Least Significant Byte first) |
| n+Lv-1[1] | Vendor Specific Payload | Vendor Specific Payload |

FIG. 27

| Name | Description | Value |
|---|---|---|
| Start | Specific start 'bit' | N/A |
| Header Block | Source and destination addresses | 1 Byte, describing source type and sink type. |
| Vendor ID | IEEE Vendor Address | 3 bytes = IEEE OUI assignment |
| Data Block 1 (optcode block) | Optcode | Tag Nr. (1 byte) |
| Data Block 2 (operand blocks) | Length (optional) | Length of following data in bytes (1 Byte) |
| | Packed_Seq | [2 bits] indicates whether this packet is the only, the or the last packet in a Gamut Metadata packet sequence<br>= 0 (0b00) Intermediate packet in sequence<br>= 1 (0b01) First packet in sequence<br>= 2 (0b10) Last packet in sequence<br>= 3 (0b11) Only packet in sequence |
| | Operand(s) specific to optcode (Optional, depending on optcode) | |

| Byte | Bit 7 | 6 | 5 | 4 | 3 | 2 | 1 | 0 | EOM | ACK | |
|---|---|---|---|---|---|---|---|---|---|---|---|
| 1 | x | x | x | x | 0 | 0 | 0 | 0 | 0 | 1 | Header block for a) display and b) broadcast command |
|   | Initiator | | | | Destination | | | | | | |
| 2 | 1 | 0 | 1 | 0 | 0 | 0 | 0 | 0 | 0 | 1 | Data block for Vendor Command with ID (0xA0) |
| 3 | | | | | | | | | 0 | 1 | Start of Vendor Command with ID |
| 4 | Vendor ID – 24-Bit IEEE Registration Identifier (least significant byte first) e.g. 0x000C30 | | | | | | | | 0 | 1 | |
| 5 | | | | | | | | | 0 | 1 | |
| 6 | "Validate" | | | | | | | | 1 | 1 | Vendor Command |

3200

METHOD AND SYSTEM FOR LOOK DATA DEFINITION AND TRANSMISSION OVER A HIGH DEFINITION MULTIMEDIA INTERFACE

CROSS-REFERENCE TO RELATED APPLICATIONS

This application claims the benefit, under 35 U.S.C. §365 of International Application PCT/IB2008/000223, filed Jan. 31, 2008, which was published in accordance with PCT Article 21(2) on Aug. 6, 2009, in English. Further, this application is related to International Application PCT/IB2008/000224, filed Jan. 31, 2008, entitled, "METHOD AND SYSTEM FOR LOOK DATA DEFINITION AND TRANSMISSION, which was published in accordance with PCT Article 21(2) on Aug. 6, 2009, in English.

FIELD OF THE INVENTION

The present principles generally relate to multimedia interfaces and, more particularly, to a method and system for look data definition and transmission over a high definition multimedia interface (HDMI).

BACKGROUND OF THE INVENTION

Currently, when delivering a video content product either for home use or for professional use, there is one singular color decision made for that video delivery product, which is typically representative of the video content creator's intent. However, different usage practices of the content may occur so that the content's color decision may have to be altered. For instance, such different usage practices may involve different display types such as a front projection display, a direct view display, or a portable display, each requiring some change to the color decision to provide an optimal display of such video content.

SUMMARY OF THE INVENTION

A method and system in accordance with various embodiments of the present principles address the deficiencies of the prior art by providing look data definition and transmission over a high definition multimedia interface (HDMI).

According to an aspect of the present principles, there is provided a method. The method includes generating metadata for video content. The metadata is for altering the video content before display thereof by accounting for variations between different display devices and variations between different creative intents by a content creator. The method further includes preparing the video content and the metadata for transmission over a high definition multimedia interface.

According to another aspect of the present principles, there is provided a system. The system includes a metadata generator and a metadata transmission preparation device. The metadata generator is for generating metadata for video content. The metadata for altering the video content before display thereof by accounting for variations between different display devices and variations between different creative intents by a content creator. The metadata transmission preparation device is for preparing the video content and the metadata for transmission over a high definition multimedia interface.

BRIEF DESCRIPTION OF THE DRAWINGS

The teachings of the present principles can be readily understood by considering the following detailed description in conjunction with the accompanying drawings, in which:

FIG. 8 depicts an exemplary Look Data Elementary Message 800 implemented as a 3D-LUT with a bit depth of 8 bits, in accordance with an embodiment of the present invention;

FIG. 9 depicts an exemplary Look Data Elementary Message 900 implemented as a 3D-LUT with a bit depth of 10 bits, in accordance with an embodiment of the present invention;

FIG. 10 depicts an exemplary Look Data Elementary Message 1000 implemented as a 1D-LUT with a bit depth of 8 bits, in accordance with an embodiment of the present invention;

FIG. 11 depicts an exemplary Look Data Elementary Message 1100 implemented as a 1D-LUT with a bit depth of 10 bits, in accordance with an embodiment of the present invention;

FIG. 12 depicts, an exemplary Look Data Elementary Message 1200 implemented as a 3×3 matrix with a bit depth of 8 bits, in accordance with an embodiment of the present invention;

FIG. 13 depicts an exemplary Look Data Elementary Message 1300 implemented as a 3×3 matrix with a bit depth of 10 bits, in accordance with an embodiment of the present invention;

FIG. 14 depicts an exemplary Look Data Elementary Message 1400 implemented as a 3×3 matrix with a bit depth of 16 bits, in accordance with an embodiment of the present invention;

FIG. 17 depicts an exemplary Look Data Elementary Message 1700 for 8 bit frequency equalization, in accordance with an embodiment of the present invention;

FIG. 18 depicts an exemplary Look Data Elementary Message 1800 for motion behavior, in accordance with an embodiment of the present invention;

FIG. 19 depicts an exemplary Look Data Elementary Message 1900 for film grain, in accordance with an embodiment of the present invention;

FIG. 20 depicts an exemplary Look Data Elementary Message 2000 for noise, in accordance with an embodiment of the present invention;

FIG. 21 depicts an exemplary Look Data Elementary Message 2100 for time editing capable of being used for editorial control, in accordance with an embodiment of the present invention;

FIG. 22 depicts an exemplary Look Data Elementary Message 2200 for tone mapping, in accordance with an embodiment of the present invention;

FIG. 23 depicts an exemplary HDMI Gamut Metadata Packet 2300 to which embodiments of the present invention can be applied, in accordance with an embodiment of the present invention;

FIG. 24 depicts an exemplary HDMI Gamut Metadata Header 2400 to which the present invention can be applied, in accordance with an embodiment of the present invention;

FIG. 26 depicts an exemplary look data packet header 2600 for a vendor specific info frame in accordance with an embodiment of the present invention;

FIG. 27 depicts an exemplary vendor specific info frame 2700 in CEA 861D to which the present principles may be applied, in accordance with an embodiment of the present invention;

FIG. 28 depicts exemplary vendor specific CEC instructions 2800 for transmitting look data in accordance with an embodiment of the present invention;

FIG. 32 depicts an exemplary Look Data Elementary Message 3200 for look data validation, in accordance with an embodiment of the present invention;

Figure 1:
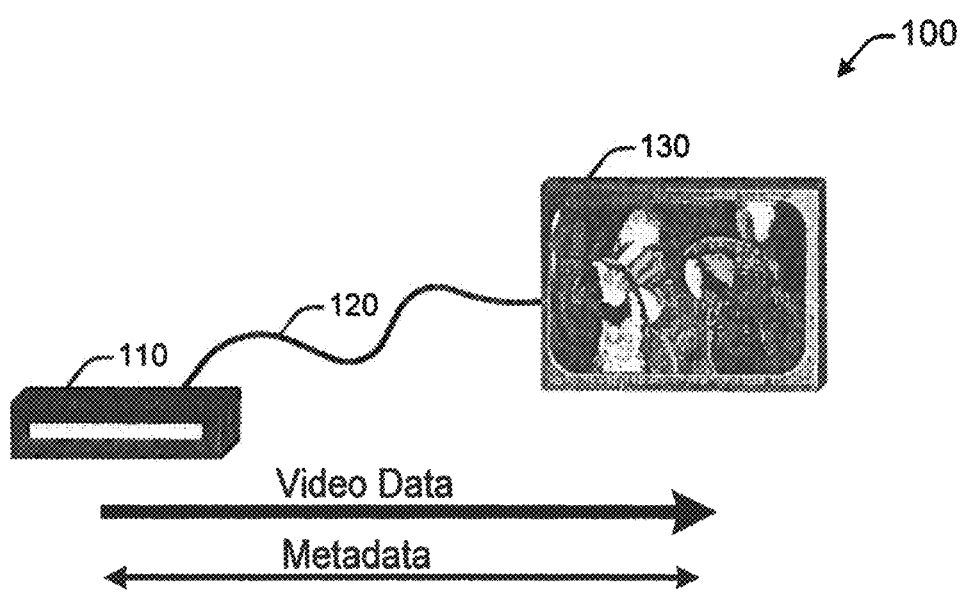
FIG. 1 depicts a high level block diagram of a system 100 for transmitting look data over a high definition multimedia interface connection, in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present principles advantageously provide a method and system for look data definition and transmission over a high definition multimedia interface (HDMI). Although the present principles will be described primarily within the context of a transmission system relating to a source device and a display device, the specific embodiments of the present invention should not be treated as limiting the scope of the invention.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Moreover, as used herein, with respect to the transmission and receipt of metadata, the phrase "in-band" refers to the transmitting and/or receiving of such metadata together with the color corrected picture content to be displayed by a consumer device. In contrast, the phrase "out-of-band" refers to the transmitting and/or receiving of the metadata separately with respect to the color corrected picture content to be displayed by a consumer device.

Further, as used herein, the term "scene" refers to a range of picture frames in a motion picture, usually originating from a single "shot", meaning a sequence of continuous filming between scene changes.

Also, as used herein, the phrase "Look Data Management" refers to the editing of look data, the transmission, and the application.

Additionally, as used herein, the phrase "compact disc player" refers to any of a standard definition compact disc player, a BLU-RAY digital video disc player, a high definition digital video disc player, and so forth.

Moreover, as used herein, "unused gamut profile" refers to a gamut profile that is currently not used in version 1.3 (or any preceding version) of the HDMI Standard.

Further, as used herein, the phrase "look data", and term "metadata" as it relates to such look data, refers to data such as, for example, integer, non-integer values, and/or Boolean values, used for and/or otherwise relating to color manipulation, spatial filtering, motion behavior, film grain, noise, editorial, and tone mapping. Such look data and/or metadata may be used to control, turn on or turn off relating mechanisms for implementing the preceding, and to modify the functionality of such. Furthermore, look data and/or metadata may include a specification of a mapping table.

For example, in an embodiment directed to color manipulation, a color mapping table could be realized by means of a 1-D LUT (one-dimensional Look Up Table), a 3-D LUT (three-dimensional Look Up Table), and/or 3×3 LUTs. As an example, in the case of a 3-D LUT, such LUT is used to receive three input values, each value representing one color component, Red, Green, or Blue, and producing a predefined triplet of output values, e.g., Red, Green, and Blue, for each individual Red, Green, and Blue input triplet. In this case, the metadata from a content source to a content consumption device (e.g., a display device) would then include a LUT specification.

Another embodiment may involve the specification of a mapping function such as, for example, circuitry and/or so forth for performing a "GOG" (Gain, Offset, Gamma), which is defined as follows:

$V\text{out}=\text{Gain}*(\text{Offset}+V\text{in})^\text{Gamma}$, for each color component.

In such a case, the look data and/or metadata would include nine (9) values, one set of Gain, Offset, and Gamma for each of the three color components.

Look data, as used herein, is used to influence these mechanisms; there can be several sets of look data, in order to implement transmission/storage of not only one, but several looks.

Of course, the present principles are not limited to the preceding embodiments and, given the teachings of the present principles provided herein, other embodiments involving other implementations of look data and/or metadata are readily contemplated by one of ordinary skill in this and related arts, while maintaining the spirit of the present principles. Look data is further described herein at least with respect to FIG. 5.

For example, FIG. 1 depicts a high level block diagram of a system 100 for transmitting look data over a high definition multimedia interface connection, in accordance with an embodiment of the present invention. The system 100 of FIG. 1 illustratively includes and/or otherwise involves a content source device 110, a high definition multimedia interface (HDMI) connection device 120, and a display device 130. It is to be appreciated that the content source device 110 can be, but is not limited to, a high definition digital video disk player, a BLU-RAY player, and a network access unit (for example, including, but not limited to, a set top box (STB)). The content source device 110 provides the content that is to be transmitted via the high definition multimedia interface connection device 120 to the display device 130 for display thereof. Metadata including, for example, look data, can be provided from the content source 110 to the display device 130, and from the display device 130 to the content source 110. It is to be appreciated that the high definition multimedia interface (HDMI) connection device 120 can include, but is not limited to, a high definition multimedia interface (HDMI) cable.

The display device 130 (and/or a device(s) disposed between the transmission medium 120 and the display device 130 and connected to these devices) can include a receiver 161, a storage device 162, and/or a metadata applier 162 for respectively receiving, storing, and applying the metadata.

Figure 2:
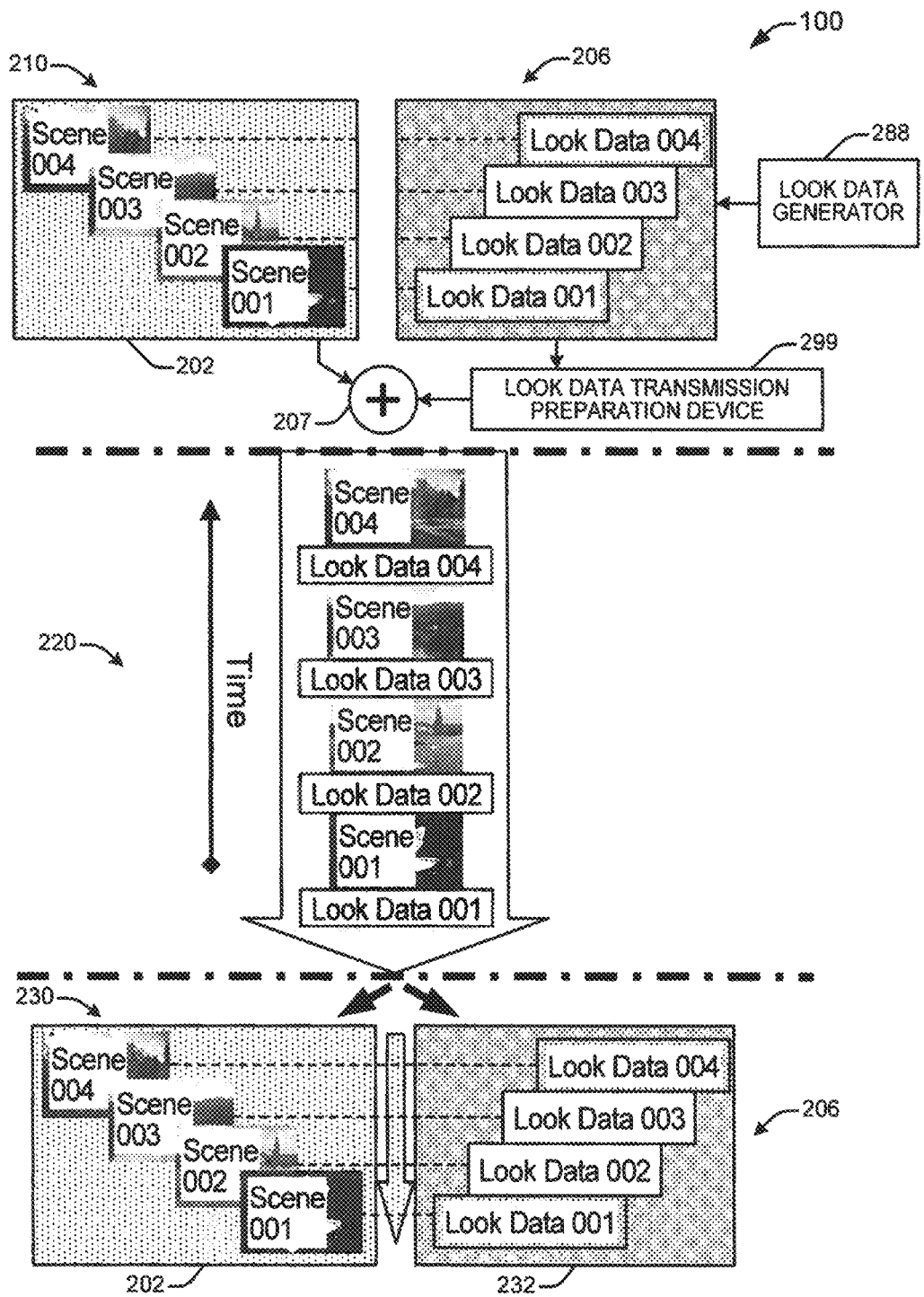
FIG. 2 depicts a more detailed high level block diagram of the system 100 of FIG. 1 implementing sequential look data transmission, in accordance with an embodiment of the present invention.

For example, FIG. 2 depicts a more detailed high level block diagram of the system 100 of FIG. 1 using sequential look data transmission, in accordance with an embodiment of the present invention. In the embodiment of FIG. 2, the content 202 and a look data database 204 are disposed at a content authoring portion 210 of the system 100. In the embodiment of FIG. 2, the look database 204 stores look data. In one embodiment, the content authoring portion 210 of the system 100 includes a look data generator 288 for generating the look data 206 and a look data transmission preparation device 299 for preparing the look data for transmission over HDMI as further described herein below. The content 202 and the look data 206 are combined 207 at the content authoring portion 210. Using one or more transmission and/or storage mediums 220, the content 202 and corresponding look data 206 are sequentially transmitted to a content display portion 230 of the system 100, where the content 202 and the look data 206 are separated and processed. The content display portion 230 of the system 100 can include, for example, the display device 130 depicted in FIG. 1. The look data 206 can then be stored in a look data database 232 disposed at the content display portion 230 of the system 100. It is to be appreciated that the transmission and/or storage mediums 220 depicted in FIG. 2 incorporate the sequential transmission and/or storage of the content 202 and/or look data 206.

Figure 3:
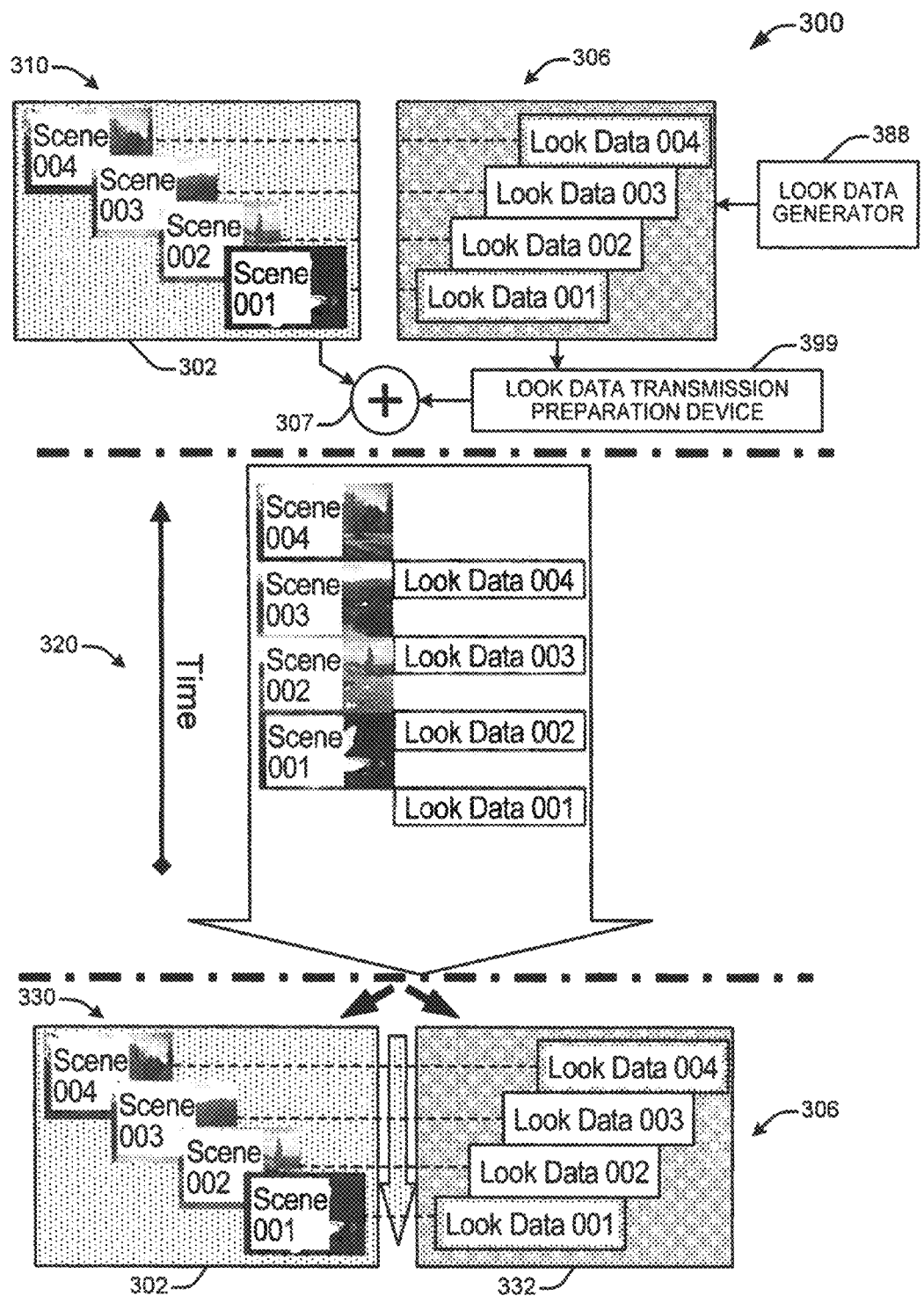
FIG. 3 depicts a more detailed high level block diagram of the system 100 of FIG. 1 implementing parallel look data transmission, in accordance with an alternate embodiment of the present invention.

FIG. 3 depicts a more detailed high level block diagram of the system 100 of FIG. 1 implementing parallel look data transmission, in accordance with an alternate embodiment of the present invention. In the embodiment of FIG. 3, the content 302 and a look data database 304 are disposed at a content authoring portion 310 of the system 300. In the embodiment of FIG. 3, the look database 304 stores look data 306. In one embodiment, the content authoring portion 310 of the system 300 includes a look data generator 388 for generating the look data 306 and a look data transmission preparation device 399 for preparing the look data 306 for transmission over HDMI as further described herein below. The content 302 and the look data 306 are combined 307 at the content authoring portion 310. Using one or more transmission and/or storage mediums 320, the content 302 and corresponding look data 306 are transmitted in parallel to a content display portion 330 of the system 300, where the content 302 and the look data 306 are separated and processed. The content display portion 330 of the system 300 can include, for example, the display device 130 depicted in FIG. 1. The look data 306 can then be stored in a look data database 332 disposed at the content display portion 330 of the system 300. It is to be appreciated that the transmission and/or storage mediums 320 depicted in FIG. 3 incorporate the parallel transmission and/or storage of the content 302 and/or look data 306.

Figure 4:
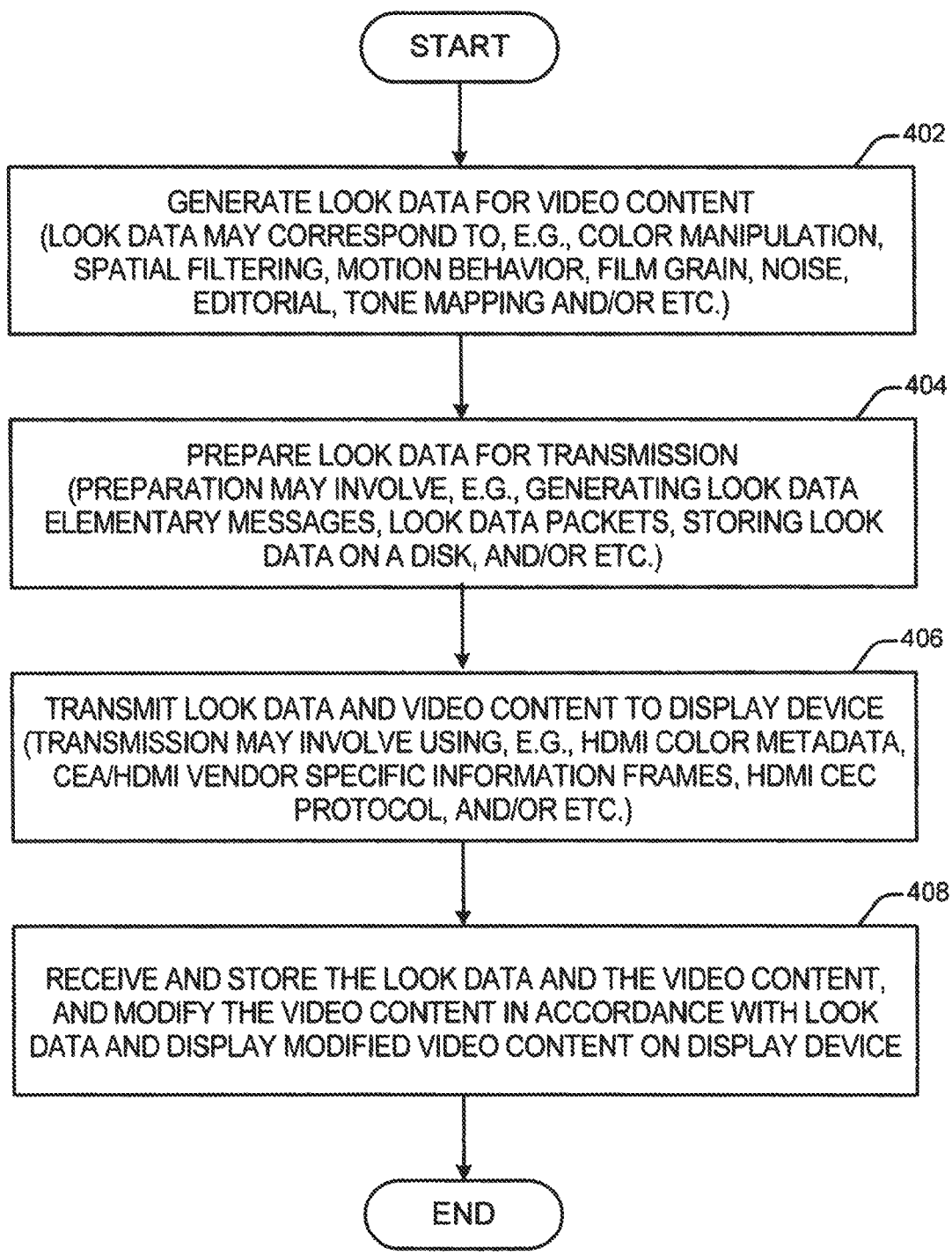
FIG. 4 depicts a flow diagram of a method for look data definition and transmission in accordance with an embodiment of the present invention.

FIG. 4 depicts a flow diagram of a method for look data definition and transmission in accordance with an embodiment of the present invention. The method 400 begins at step 402, in which look data is generated for video content. Such look data can relate to, but is not limited to, color manipulation, spatial filtering, motion behavior, film grain, noise, editorial, tone mapping, and the like. Such look data can be used to control, turn-on or turn-off relating mechanisms for implementing the preceding, and to modify the functionality of such. The method then proceeds to step 404.

At step 404, the look data is prepared for transmission, which can involve, but is not limited to, generating one or more Look Data Elementary Messages for the look data (previously generated at step 402), generating one or more look data packets that respectively include one or more Look Data Elementary Messages, storing look data on a disk, and the like. The method then proceeds to step 406.

At step 406, the look data and the video content are transmitted to a display device using HDMI. Such transmission can involve, for example, but is not limited to, using HDMI color metadata, CEA/HDMI vendor specific information frames, HDMI/CEC (consumer electronic control) protocol, and/or the like. With respect to using HDMI color metadata for the transmission, such use can involve using a gamut Boundary description (GBD) metadata container. With respect to using CEA/HDMI vendor specific information frames for the transmission, such use can involve applying GBD flow control to vendor specific information frames. With respect to using the HDMI CEC protocol for the transmission, such use can involve adding a network abstraction layer on top of CEC, enabling Quality of Service (QoS), and timing CEC to video. The method then proceeds to step 408.

At step 408, the video content is received, stored, and modified in accordance with the look data and the modified video content is displayed on the display device. The method 400 can then be exited.

It is to be appreciated that the preceding order and use of received, stored, and modified can vary depending on the actual implementation. For example, storage can correspond to the metadata being provided on a storage medium and/or can correspond to temporally storing the same on the content rendition side for subsequent processing.

In one embodiment of the present invention, the principles of the present invention are used to create content for High Definition-Digital Video Discs (HD DVDs) and/or BLU-RAY discs by encoding the content in accordance with the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"), storing the content on a disc, then controlling signal processing units in a display to alter the video data for display. In such an application, look data is stored on the disc. The look data is then transmitted to the display using a high definition multimedia interface (HDMI). Various exemplary methods for using HDMI to transmit the look data are described herein. Of course, it is to be appreciated that the present principles are not limited to solely the described embodiments and, given the teachings of the present principles provided herein, one of ordinary skill in this and related arts will contemplate these and various other embodiments and variations thereof, while maintaining the spirit of the present principles.

It is to be appreciated that, in various embodiments, the present principles can be used in a professional or semiprofessional environment including, but not limited to, processing "Digital Dailies" in motion picture production.

Scene Bound Data

Figure 5:
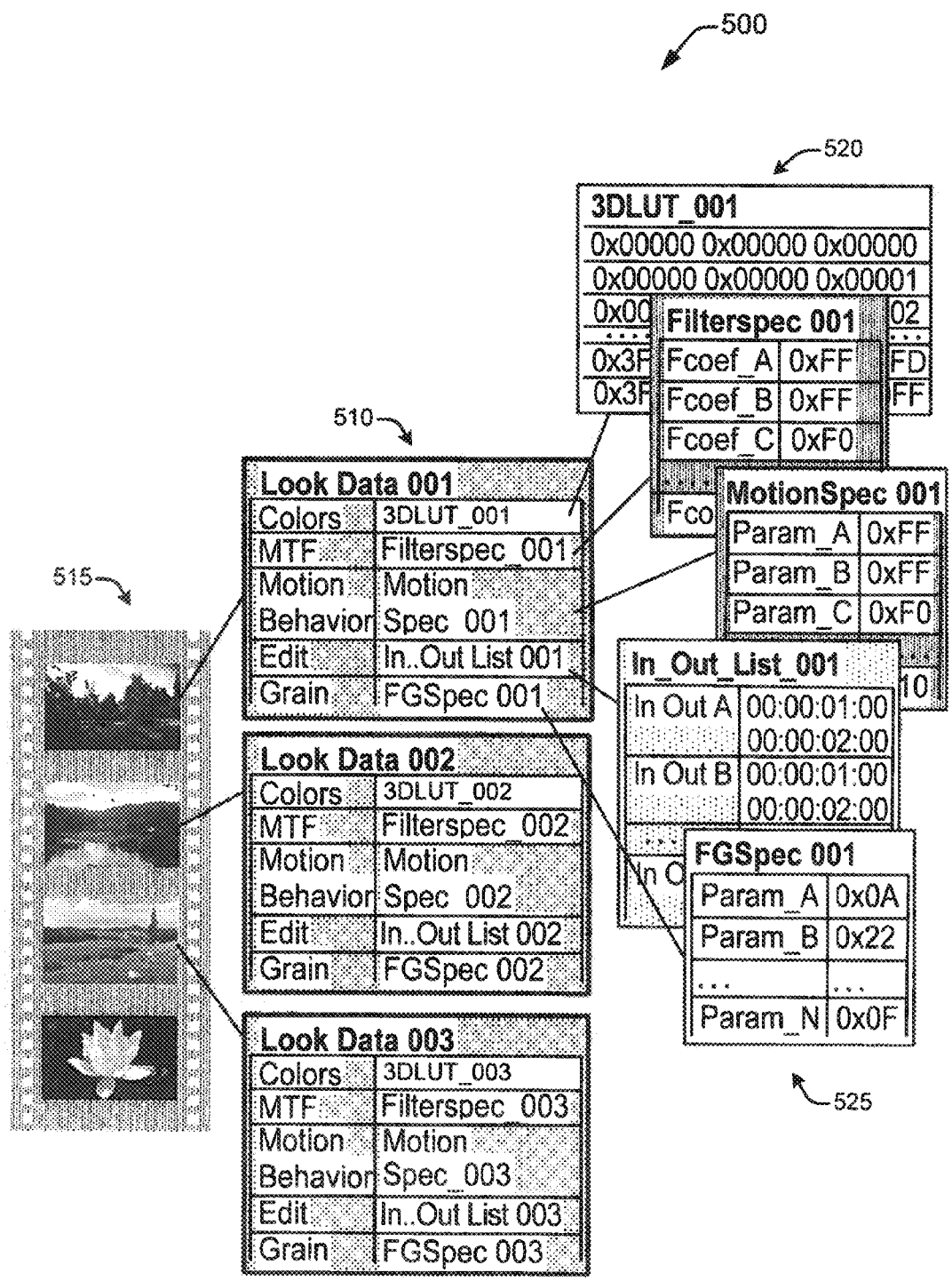
FIG. 5 depicts an exemplary representation of look data 500, in accordance with an embodiment of the present principles.

FIG. 5 depicts an exemplary representation of look data 500, in accordance with an embodiment of the present principles. The look data 500 of FIG. 5 illustratively includes look data packets 510, one for each scene or sequence or scenes 515. It should be noted that it is typically up to the content producer to define scene boundaries. As depicted in FIG. 5, each look data packet (LDP) 510 can include one or more Look Data Elementary Messages 520. Each Look Data Elementary Message (LDEM) can include parameters 525 that control one signal processing unit for content rendering and/or display. More specifically, in accordance with embodiments of the present invention, the look data packets 510 and as such the Look Data Elementary Messages 520 and parameters 525 are intended to be delivered or communicated with respective video content to a display system including a content rendering device. At the display system, the content rendering device (e.g., decoder of a display or Set-top Box) applies the look data packets 510 to the respective video content to affect or change the display attributes of the scene or sequence of scenes for which the look data was created in accordance with the parameters in the Look Data Elementary Messages 520.

In one embodiment, the look data 500 can be shared among scenes 515 by not updating the look data 500 on scene changes if it is determined that the look data 500 is equal between scenes 515. Thus, the look data 500 stays valid until the look data 500 is invalidated or updated. Such an invalidation can include a disabling of the application of the LDEM metadata, by asserting a "FALSE" to the "Data Valid" tag in a "Look Data Elementary Message". The alternative is to send a new LDEM with the same Tag ID.

Look Data Packet

In one embodiment of the present invention, for Look Data Packet transmission, a "KLV" (Key, Length, Value) metadata concept is implemented, however, other known Look Data Packet transmission concepts can be implemented. That is, while one or more embodiments are described herein with respect to the KLV metadata concept, it is to be appreciated that the present principles are not limited to solely implementing the KLV metadata concept and, thus, other approaches to implementing the Look Data Packets can also be implemented in accordance with various embodiments of the present invention, while maintaining the spirit of the present principles.

Figure 6:
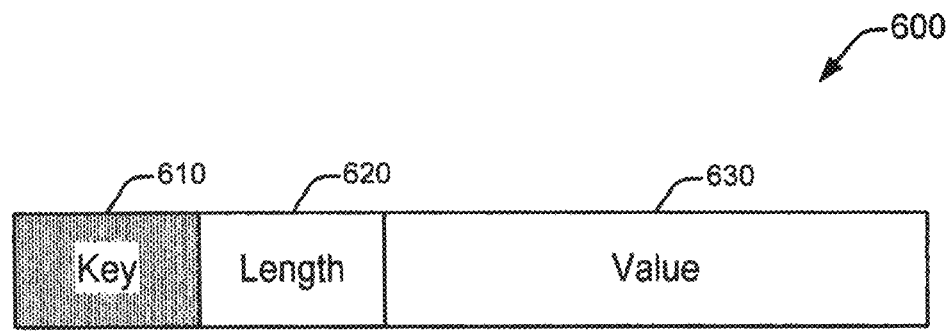
FIG. 6 depicts exemplary KLV notation of metadata 600 for use in Look Data Elementary Messages, in accordance with an embodiment of the present invention.
Figure 7:
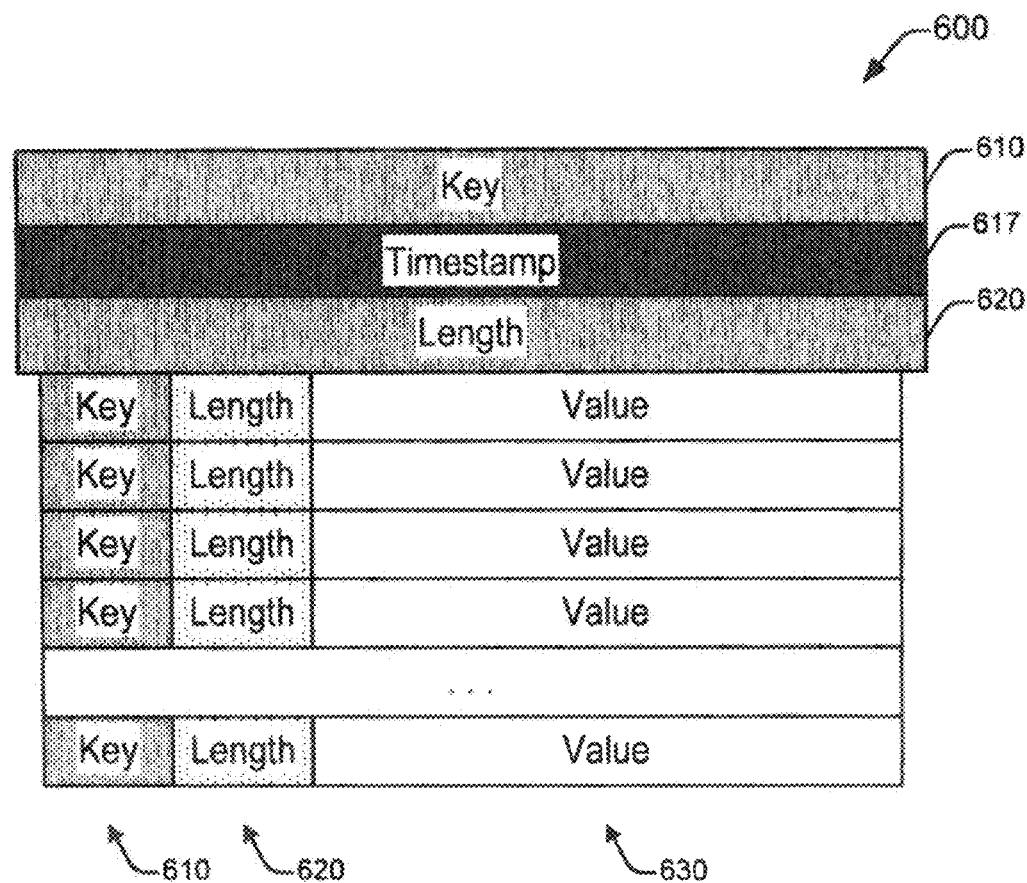
FIG. 7 depicts the KLV notation of metadata 600 of FIG. 6 in further detail, in accordance with an embodiment of the present invention.

The KLV concept is useful for the transmission devices to understand when a packet transmission is concluded without having to parse the content. This is illustrated in FIG. 6 and FIG. 7. For example, FIG. 6 depicts exemplary KLV notation of metadata 600 for use in Look Data Elementary Messages, in accordance with an embodiment of the present invention. FIG. 7 depicts the KLV notation of metadata 600 of FIG. 6 in further detail, in accordance with an embodiment of the present invention.

More specifically and referring to FIG. 6 and FIG. 7, each packet can include a "key" field 610 that indicates the nature of the message, for example, that the message relates to "Look Data". The key can include a time stamp 617 or, alternatively, a "scene ID", so that the receiving unit immediately knows on which scene the data has to be ready for application. It is to be appreciated that the time stamp 617 and/or scene ID are optional, and can be used, for example, for systems where time code tracking takes place. Moreover, each packet can include a length field 620 that indicates the number of words in the payload portion of the packet. It is to be appreciated that the length field 620 is also optional, and its use can depend, for example, on the metadata tag.

Further, each packet can include a value field 630 for carrying the payload portion of the packet. In one embodiment, the word size of the payload contents can be determined by a metadata tag. In one embodiment of the present invention, the payload can include, for example, individual "Look Data Elementary Messages", where another layer of KLV can be used or, alternatively, only KV (Key and Value).

Look Data Elementary Messages

1. Color Manipulation

In one embodiment of the present invention, color manipulation can be defined in a Look Data Elementary Message. That is, color manipulation can be implemented, for example, by one or more 3D-LUT's, one or more 1D-LUT's, and/or one or more 3×3 LUT's. For example, an exemplary definition of such Look Data Elementary Messages is provided in FIG. 8 through FIG. 14.

More specifically, FIG. 8 depicts an exemplary Look Data Elementary Message 800 implemented as a 3D-LUT with a bit depth of 8 bits, in accordance with an embodiment of the present invention. As depicted in FIG. 8, the Look Data Elementary Message 800 includes a Tag ID section 810 and a Value section 820. The Value section 820 illustratively includes a validity section, a color space definition section, a length definition section, and a values section. Each of the sections of the Look Data Elementary Message 800 of FIG. 8 contains a respective Description and Name section. The Tag ID section 810 of FIG. 8 defines an 8 bit ID of the 3D-LUT, which is illustratively 0x11. In the Value section 820, the validity section defines if the data is valid or not and in FIG. 8 is illustratively defined in Boolean. In the Value section 820, the color spaced section defines the color space and in FIG. 8 is illustratively defined as [00]=RGB, [01]=XYZ, [10]=YCrCb, and [11]=reserved.

The length definition section in the Value section 820 of FIG. 8 defines a length of the payload in bytes, which is illustratively assumed to be 8 bit node data. In addition, the values section defines various values such as LUT node data, the spacing of the input data, which is illustratively assumed to be regularly spaced, word definitions and order, illustratively "first word RED, CIE_X or Y", "second word is GREEN, CIE_Y, or Cr", and "third word is BLUE, CIE_Z, or Cb". In the Look Data Elementary Message 800 of FIG. 8, the values section also illustratively defines a Lattice scan of "BLUE changes first, then Green, then RED".

FIG. 9 depicts an exemplary Look Data Elementary Message 900 implemented as a 3D-LUT with a bit depth of 10 bits, in accordance with an embodiment of the present invention. The Look Data Elementary Message 900 of FIG. 9 is substantially similar to the Look Data Elementary Message 800 of FIG. 8 except that in FIG. 9, the ID of the 3D-LUT has a bit depth of 10 bits and having a value of 0x12. In addition, in the Look Data Elementary Message 900 of FIG. 9 the length definition defines a length of the payload illustratively assumed to be 10 bit node data, packed into one 32 bit word. Furthermore, in the embodiment of FIG. 9, the values section further defines the words "RED", "GREEN" and "BLUE" as follows:

Word=RED<<20+GREEN<<10+BLUE.

FIG. 10 depicts an exemplary Look Data Elementary Message 1000 implemented as a 1D-LUT with a bit depth of 8 bits, in accordance with an embodiment of the present invention. In the Look Data Elementary Message 1000 of FIG. 10, the ID of the 1D-LUT has a bit depth of 8 bits with a value of 0x13. Different from the Look Data Elementary Messages of FIG. 8 and FIG. 9 above, in the Look Data Elementary Message 1000 of FIG. 10 the color definition section defines the color, whether it is a LUT for the RED channel, the GREEN channel, or the BLUE channel, or whether the LUT is to be applied to all channels. In FIG. 10, the color values are illustratively defined as [00]=RED or CIE_X or Y, [01]=GREEN or CIE_Y or Cr, [10]=BLUE or CIE_Z or Cb, and [11]=All channels. In addition, in the Look Data Elementary Message 1000 the values section defines that the LUT output data is expected to be 256 8-bit values starting with the output value for the smallest input value.

FIG. 11 depicts an exemplary Look Data Elementary Message 1100 implemented as a 1D-LUT with a bit depth of 10 bits, in accordance with an embodiment of the present invention. The Look Data Elementary Message 1100 of FIG. 11 is substantially similar to the Look Data Elementary Message 1000 of FIG. 10 except that in the embodiment of FIG. 11, the Look Data Elementary Message 1100 comprises an ID having a bit depth of 10 bits having a value of 0x14. In addition, in the Look Data Elementary Message 1100 the values section defines that the LUT output data is expected to be 1024 10-bit values starting with the output value for the smallest input value and that packetized are three, 10-bit values into one 32 bit word having values as follows:

Word=LUT[0]<<20+LUT[1]<<10+LUT[2].

FIG. 12 depicts, an exemplary Look Data Elementary Message 1200 implemented as a 3×3 matrix with a bit depth of 10 bits, in accordance with an embodiment of the present invention. In the Look Data Elementary Message 1200 the color definition defines a matrix application having values of [00]=RGB to RGB (gamma), [01]=RGB to RGB (linear) and [11]=XYZ to XYZ. In addition, in the Look Data Elementary Message 1200 of FIG. 12, the values section defines coefficient values expected as nine, 10-bit values in the form:

$$\begin{bmatrix} B1 \\ B2 \\ B3 \end{bmatrix} = \begin{bmatrix} C1 & C2 & C3 \\ C4 & C5 & C6 \\ C7 & C8 & C9 \end{bmatrix} \times \begin{bmatrix} A1 \\ A2 \\ A3 \end{bmatrix}$$

where A1 and B1 is RED or CIE_X, A2 and B2 is GREEN or CIE_Y, and A3 and B3 is BLUE or CIE_Z and the sequence of order is C1-C2-C3. In the Look Data Elementary Message 1200 of FIG. 12, the values section defines that the three coefficients are packed into one, 32-bit word so that the total payload is 3×32 bit=96 bits having values as follows:

Word=C1<<20+C2<<10+C3.

FIG. 13 depicts an exemplary Look Data Elementary Message 1300 implemented as a 3×3 matrix with a bit depth of 8 bits, in accordance with an embodiment of the present invention. The Look Data Elementary Message 1300 of FIG. 13 is substantially similar to the Look Data Elementary Message 1200 of FIG. 12 except that in the embodiment of FIG. 13, the Look Data Elementary Message 1300 comprises an ID having a bit depth of 8 bits having a value of 0x16. In addition, in the Look Data Elementary Message 1300 of FIG. 13 the total payload is 9×8 bit=72 bits.

FIG. 14 depicts an exemplary Look Data Elementary Message 1400 implemented as a 3×3 matrix with a bit depth of 16 bits, in accordance with an embodiment of the present principles. The Look Data Elementary Message 1400 of FIG. 14 is substantially similar to the Look Data Elementary Message 1200 of FIG. 12 and the Look Data Elementary Message 1300 of FIG. 13 except that in the embodiment of FIG. 14, the Look Data Elementary Message 1400 comprises an ID having a bit depth of 16 bits having a value of 0x17. In addition, in the Look Data Elementary Message 1400 of FIG. 14 the total payload is 9×16 bit=144 bits.

2. Spatial Filter

Figure 15:
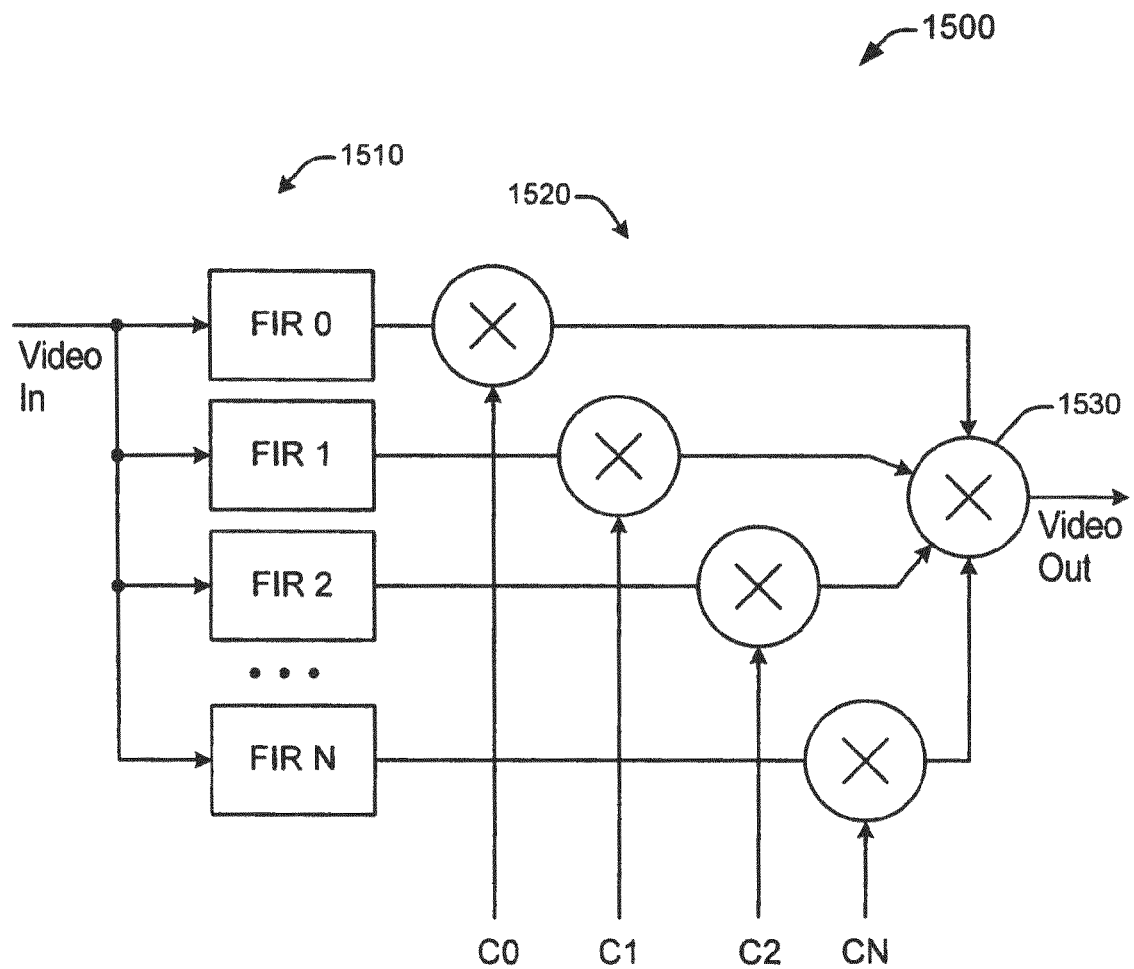
FIG. 15 depicts an exemplary filter bank 1500 for frequency response modification, in accordance with an embodiment of the present invention.

In an embodiment of the present invention, spatial filtering control can be specified in a Look Data Elementary Message. For example, the spatial response or frequency response can be altered using spatial domain filtering. One exemplary method of changing the spatial frequency response is to use a bank of finite impulse response (FIR) filters, each tuned to one particular center frequency. FIG. 15 depicts an exemplary filter bank 1500 for frequency response modification, in accordance with an embodiment of the present invention. The filter bank 1500 of FIG. 15 illustratively includes a plurality of filters 1510, at least one multiplier 1520, and at least one combiner 1530.

Figure 16:
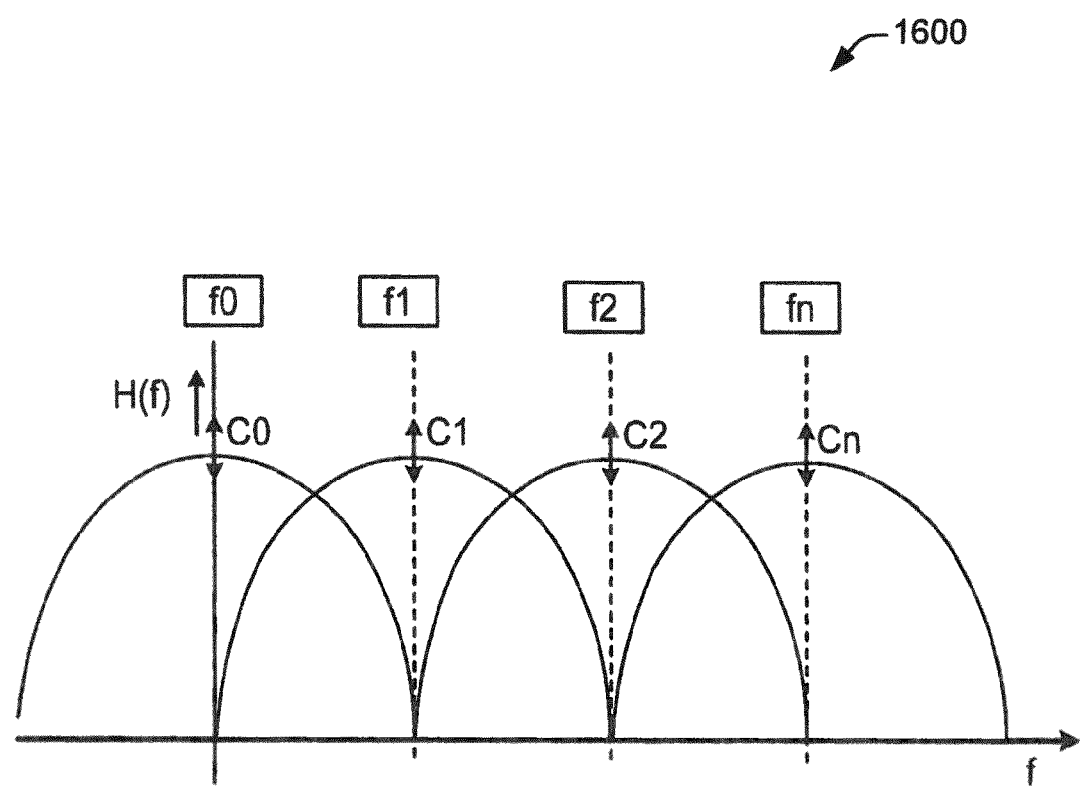
FIG. 16 depicts discrete frequencies 1600 for frequency equalization, in accordance with an embodiment of the present invention.

In one embodiment, the frequency response of a picture is manipulated by changing the filter coefficients (C0 . . . CN), in order to enhance or attenuate a frequency detail. For example, FIG. 16 depicts exemplary discrete frequencies 1600 for frequency equalization, in accordance with an embodiment of the present invention. As depicted in FIG. 16, the filter coefficients (C0 . . . CN) can be specified with the Look Data Elementary Message for frequency response.

For example, FIG. 17 depicts an exemplary Look Data Elementary Message 1700 for 8 bit frequency equalization, in accordance with an embodiment of the present invention. As depicted in the embodiment of FIG. 17, the Look Data Elementary Message 1700 defines a number of coefficients for the frequency equalizer, for example, up to 16, 4 bit, and defines that every coefficient controls one frequency band multiplier.

3. Motion Behavior

In one embodiment, motion behavior control can be specified in a Look Data Elementary Message, utilizing a message that contains information for allowing the display to align the motion behavior to a desired motion behavior. This information carries the specification of the desired motion behavior, and additionally can carry helper data from a content preprocessing unit that simplifies processing in the display. For example, FIG. 18 depicts an exemplary Look Data Elementary Message 1800 for motion behavior, in accordance with an embodiment of the present invention. The Look Data Elementary Message 1800 of the embodiment of FIG. 18 illustratively defines an input frame rate in HZ (U8), a field repetition (U8), a desired display behavior (U16), and an eye motion trajectory in x/y (2×U32). In addition, in the Look Data Elementary Message 1800 of the embodiment of FIG. 18 it is defined whether preprocessing or motion estimation exists.

4. Film Grain

In an embodiment, film grain control can be specified in a Look Data Elementary Message. In one embodiment of the present invention, the film grain message can be taken from the MPEG-4 AVC Standard, payload type=19. FIG. 19 depicts an exemplary Look Data Elementary Message 1900 for film grain, in accordance with an embodiment of the present invention.

5. Noise

In an embodiment, noise control can be specified in a Look Data Elementary Message. That is, it is possible to add a determined level of White Noise, same to all color channels, or one particular level/behavior per channel within the Look Data Elementary Message for noise. Moreover, in an embodiment, noise can be removed from one or more color channels. In one embodiment, the noise characteristic can be changed by modifying the frequency response in the same manner as the spatial response, as described above. FIG. 20 depicts an exemplary Look Data Elementary Message 2000 for noise, in accordance with an embodiment of the present invention.

6. Editorial

In an embodiment, the editorial of one or more scenes can be specified in a Look Data Elementary Message. For example, it is possible to cut out one or more segments of a scene or groups of scenes in accordance with a Look Data Elementary Message of the present invention. As such, the cut scene can be displayed at a later time with an update of the Editorial data. Thus, in an embodiment, a "cut list" of IN and OUT time codes within a particular scene can be transmitted. In one embodiment, the first frame of a scene would have the time code 00:00:00:00 (HH:MM:SS:FF). FIG. 21 depicts an exemplary Look Data Elementary Message 2100 for time editing capable of being used for editorial control, in accordance with an embodiment of the present invention.

7. Tone Mapping

In one embodiment, tone mapping is specified in a Look Data Elementary Message. Tone mapping can be used, for example, when converting a high dynamic range image to a low dynamic range image. As an example, a typical application could be the conversion from a 10 bit encoded image to an 8 bit or 7 bit image. It is to be appreciated that the present principles are not limited to any particular tone mapping algorithm and, thus, any approach to tone mapping can be used in accordance with the present invention, while maintaining the spirit of the present principles. As one example, tone mapping can be specified in a supplemental enhancement information (SEI) message in the MPEG-4 AVC Standard. For example, FIG. 22 depicts an exemplary Look Data Elementary Message 2200 for tone mapping, in accordance with an embodiment of the present invention. The Look Data Elementary Message 2200 of FIG. 22 is capable of specifying parameters that are also capable of being specified in an SEI message.

Look Data Transmission

In HDMI, there are different methods for transmitting look data. Some exemplary methods for transmitting look data include, but are not limited to, the use of the "Gamut Metadata Package" for data other than gamut metadata, the use of a "Vendor Specific Info Frame", and the use of consumer electronic control (CEC) vendor specific commands.

1. HDMI Color Metadata

Noting that the current version of the HDMI Specification is version 1.3A, there has been a new method for transferring colorimetric metadata via HDMI since version 1.3 of the HDMI Specification. In one embodiment of the present invention, instead of transmitting only colorimetric metadata, the transmission possibility is used to transmit the "Look Data Packet". Therefore, the use of a Gamut Profile is proposed, which is not used by the current HDMI specification, version 1.3A, for example GBD_profile=7. HDMI specification version 1.3 allows for up to 800 HDMI packets in one single transmission, but future versions of the specification may provide a different total number of packets. The time for this, however, can last up to 10 video fields, but again, this may change with future versions of the interface specification. With 28 bytes per HDMI packet, this would sum up to 21.8 Kbytes.

Hence, in embodiments of the present invention relating to such look data transmission, it should be ensured that the Look Data Packet is not larger than the maximum size of the HDMI gamut metadata packet. In addition, as Look Data Packets may have to be adapted from scene to scene, where a scene defined to be a range of video fields that share Look Data Packet Data, the scene preceding such instance of an update should be no shorter than the time it takes for "Look Data Packet" (LDP) transmission of the current scene.

For using the HDMI colorimetric metadata according to the specification version 1.3, the length of the packet is to be calculated, and GBD_Length_H (High Byte), and GBD_Length_L (Low. Byte) is to be filled into the first two bytes of the Gamut Metadata Packet, as shown in FIG. 23. That is, FIG. 23 depicts an exemplary HDMI Gamut Metadata Packet 2300 to which embodiments of the present invention can be applied, in accordance with an embodiment of the present invention.

In one embodiment, an optional checksum ban be performed of the whole packet including the GBD Header and the Look Data Packet, plus any fill data if applicable. FIG. 24 depicts an exemplary HDMI Gamut Metadata Header 2400 to which the present invention can be applied, in accordance with an embodiment of the present invention. TABLE 1 describes the semantics of the syntax elements depicted in FIG. 24, in accordance with an embodiment of the present invention. Portions of FIG. 24 and Table 1 are extracted from the "High Definition Multimedia Interface Specification Version 1.3a", referred to as Table 5-30 "Gamut Metadata Packet Header" therein.

TABLE 1

| | |
|---|---|
| Next_Field | [1 bit] Set to indicate that the GBD carried in this packet will be effective on the next video field. Specifically, the Affected_Gamut_Seq_Num for this packet will be equal to the Current_Gamut_Seq_Num for the next field. Next_Field should be set even if the GBD is already effective (e.g., Current=Affected). |
| No_Current_GBD | [1 bit] Set to indicate that there is no gamut metadata available for the currently transmitted video (i.e. current video has a standard colorimetry not requiring a GBD). When set, the field Current_Gamut_Seq_Num is meaningless and shall be ignored by the Sink. |
| GBD_profile | [3 bits] Transmission profile number:<br>0:P0<br>1:P1<br>2:P2<br>3:P3<br>other values: reserved. |
| Affected_Gamut_Seq_Num | [4 bits] Indicates which video fields are relevant for this metadata. |
| Current_Gamut_Seq_Num | [4 bits] Indicates the gamut number of the currently transmitted video stream. All Gamut Metadata Packets transmitted within the same video field shall have the same Current_Gamut_Seq_num, even if the Affected_Gamut_Seq_Num varies among the packets. |
| Packet_Seq | [2 bits] Indicates whether this packet is the only, the first, an intermediate or the last packet in a Gamut Metadata packet sequence.<br>=0 (0b00) Intermediate packet in sequence<br>=1 (0b01) First packet in sequence<br>=2 (0b10) Last packet in sequence<br>=3 (0b11) Only packet in sequence (i.e., P0) |

As depicted, the data can be divided into individual HDMI interface packets for transmission, 22 bytes for the first GBD packet, and 28 bytes for all remaining packets. If the last packet cannot be filled completely with "Look Data Packet" data, then it has to be filled with the aforementioned "fill data" which, in one embodiment of the present invention, can include one or more "0's". For data flow, the HDMI GBD data flow mechanism is used, with "Next_Field", "Affected_Gamut_Seq_Num", "Current_Gamut_Seq_Num", and "Packet_ Seq" (see FIG. 24). In case there is no look data to be applied, one transmission of "No_Current_GBD" with the according "GBD_Profile"=7 (see FIG. 24) is enough to signal this request. All look data video signal modification will then be disabled until a new Look Data Packet is sent.

Alternatively, a communication method, as described below with respect to "HDMI CEC protocol" can be used, however, the GBD method can be preferential since it features an inbuilt frame synchronization method.

Figure 25:
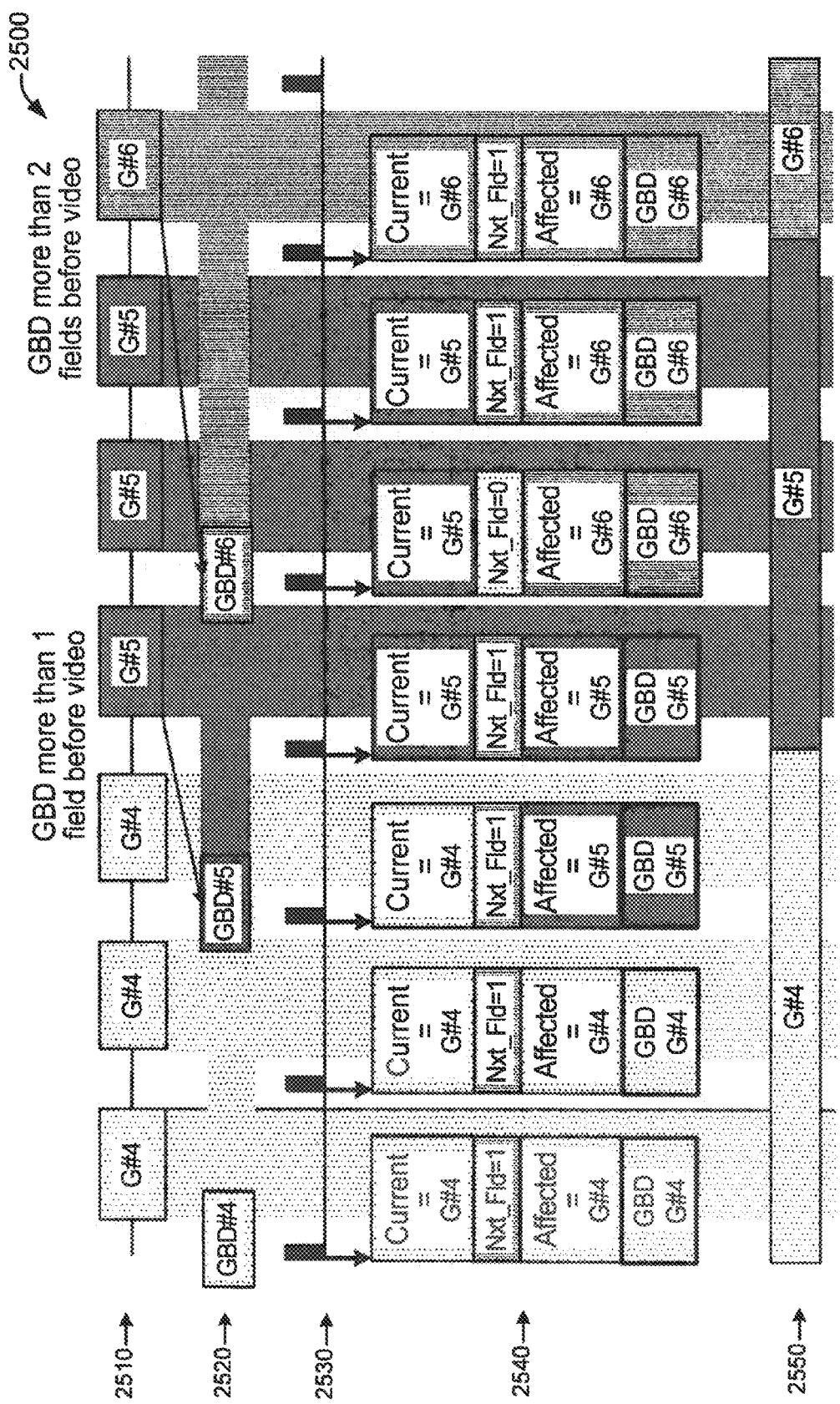
FIG. 25 depicts an exemplary gamut metadata package 2500 in HDMI version 1.3, to which the present invention can be applied, in accordance with an embodiment of the present invention.

FIG. 25 depicts an exemplary gamut metadata package 2500 in HDMI version 1.3, to which the present invention can be applied, in accordance with an embodiment of the present invention. The gamut metadata package 2500 includes an actual video portion 2510, a GBD info at source portion 2520, a VSYNC portion 2530, a gamut metadata packet portion 2540, and a sink's conversion table portion 2550. Portions of FIG. 25 are extracted from the "High Definition Multimedia Interface Specification Version 1.3a", referred to as FIG. 5-6 "Example P0 Transmission Sequence" therein.

2. CEA/HDMI Vendor Specific Info Frame

Instead of implementing the HDMI GBD metadata as described above, in alternate embodiments of the present invention a "vendor specific Info frame" can be used in accordance with the present invention. Vendor specific info frames are described, for example, in chapter 6.1 of the CEA-861-D Specification. The HDMI Specification permits the use of CEA-861-D info frames, as described in chapter 5.3.5 thereof. In fact, info frame packets are 28 bytes in length. The only difference compared to Gamut Metadata packets is that the packet size is limited to one Info Frame only. In one embodiment of the present invention, it is proposed to use the GBD metadata flow control for a vendor specific info frame as well. That is, in one embodiment, the following modification is used: due to the above mentioned restriction of vendor specific info frames to one packet only, the length field is 5 bits in size only. This means that the length info and cyclic redundancy code (CRC) info should be placed in the "GBD-like" header, the Look Data Packet header (see FIG. 26), which therefore grows from 3 bytes to 6 bytes. That is, FIG. 26 depicts an exemplary look data packet header 2600 for a vendor specific info frame to be used with HDMI version 1.3, in accordance with an embodiment of the present invention. TABLE 2, below, describes the semantics of the syntax elements shown in FIG. 26, in accordance with an embodiment of the present invention.

TABLE 2

| | |
|---|---|
| LPD_Length | [16 bit] Total length of the Look Packet Data over several Info Frames, without LPD CRC, and without Info Frames CRC. |
| CRC | [8 bit] CRC of all LPD (Look Packet Data) without LPD_Length and Info Frame header data. |
| Next_Field | [1 bit] Set to indicate that the Look Packet Data carried in this packet will be effective on the next video field. Specifically, the Affected_LPD_Seq_Num for this packet will be equal to the Current_LPD_Seq_Num for the next field. Next_Field should be set even if the Look Packet Data is already effective (e.g. Current=Affected). |
| No_Current_LPD | [1 bit] Set to indicate that there is no Look Packet Data available for the currently transmitted video (i.e. current video has a standard colorimetry not requiring a LPD). When set, the field Current_LPD_Seq_Num is meaningless and shall be ignored by the Sink. |
| LPD_profile | [3 bits] Transmission profile number:<br>7: LPD<br>other values: reserved. |
| Affected_LPD_Seq_Num | [4 bits] Indicates which video fields are relevant for this metadata |
| Current_LPD_Seq_Num | [4 bits] Indicates the gamut number of the currently transmitted video stream. All Gamut Metadata Packets transmitted within the same video field shall have the same Current_Gamut_Seq_Num, even if the Affected_Gamut_Seq_Num varies among the packets. |
| Packet_Seq | [2 bits] Indicates whether this packet is the only, the first, an intermediate or the last packet in a Look Data Packet sequence.<br>= 0 (0b00) Intermediate packet in sequence<br>= 1 (0b01) First packet in sequence<br>= 2 (0b10) Last packet in sequence<br>= 3 (0b11) Only packet in sequence |

FIG. 27 depicts an exemplary vendor specific info frame 2700, for example, in CEA 861D to which the present invention can be applied, in accordance with an embodiment of the present invention. The vendor specific info frame 2700 of FIG. 27 illustratively defines a byte number, a field name and contents. As depicted in FIG. 27, the vendor specific info frame 2700 illustratively defines an 'n' byte as a vendor specific InfoFrame Type Code having a value of $01_{16}$. The vendor specific info frame 2700 further defines an n+1 frame as a vendor specific InfoFrame Version having a value of $01_{16}$, an n+2 frame as a $L_V$ InfoFrame Length having a value equaling a total number of bytes in an InfoFrame Payload including an IEEE Registration ID, an n+3, 4, 5 frame as a 24 bit IEEE Registration Identifier (least significant byte first), and an n+$L_V$−1[1] frame as Vendor Specific Payload.

Accordingly, FIG. 28 depicts exemplary vendor specific CEC instructions 2800 for transmitting look data in accordance with an embodiment of the present invention. The vendor specific CEC instructions 2800 of FIG. 28 illustratively define a name, description and value for various CEC instructions. More specifically, in the embodiment of FIG. 28 a special start bit is defined. In addition, a vendor ID, illustratively an IEEE vendor address is defined as 3 bytes equaling the IEEE OUI assignment. The vendor specific CEC instructions 2800 of FIG. 28 also define a first data block as an opcode having a 1 byte value of Tag Nr. In the vendor specific CEC instructions 2800 starting with a second data block, operand blocks defining a length, packet sequence and operands are defined. More specifically, a length of following data is defined in bytes. A packet sequence is illustratively defined in the embodiment of FIG. 28 using 2 bits which indicates whether a packet is the only, the first or the last packet in a Gamut Metadata packet sequence. Such a packet sequence is illustratively defined in FIG. 28 as follows:

=0 (0b00) Intermediate packet in sequence
=1 (0b01) First packet in sequence
=2 (0b10) Last packet in sequence
=3 (0b11) Only packet in sequence.

3. HDMI CEC Protocol

Consumer electronic control (CEC) is a bidirectional control bus in HDMI. It is a shared media to be used by several audio/visual (NV) devices that are connected to this bus. It is very slow in nature, with a raw data transmission speed in the range of one hundred to two hundred bits per second. A single vendor specific CEC message has a maximum raw size of 16×10 bits according to HDMI Specification, Version 1.3a, and a maximum of 11×8 bits of raw payload. Considering protocol and data flow overhead of 100%-200%, the transmission of one CEC message will take several seconds. This means that if the same amount of data is transmitted as is the maximum possible with the earlier two methods, namely 21.8 kBytes, it would take several minutes to transmit. This is only true if no other device uses the bus during this time, in which case the transmission time would be further increased.

Therefore, it is advisable that the look data packet is limited in size. Certain Look Data Elementary Messages are impractical to use in a day-to-day use (especially LUT download, see FIG. 8 through FIG. 11), considering this speed.

Nevertheless, considering the payload size of a CEC frame, it is almost unavoidable that the look data packets will be longer than one CEC frame. Due to the fact that CEC has been designed for simple applications, an abstraction layer can be implemented on top of the CEC to make the communication more robust in accordance with an embodiment of the present invention.

More specifically and with respect to the International Electrotechnical Commission Open System Interconnect (ISO/OSI) reference model, the CEC functionality has a physical layer, a data link and parts of the network layer implemented. The quality of service (QoS) is not provided by the network layer. Thus, in an embodiment of the present invention, the QoS is addressed in a layer that is to be implemented on top of the CEC protocol.

Figure 29:
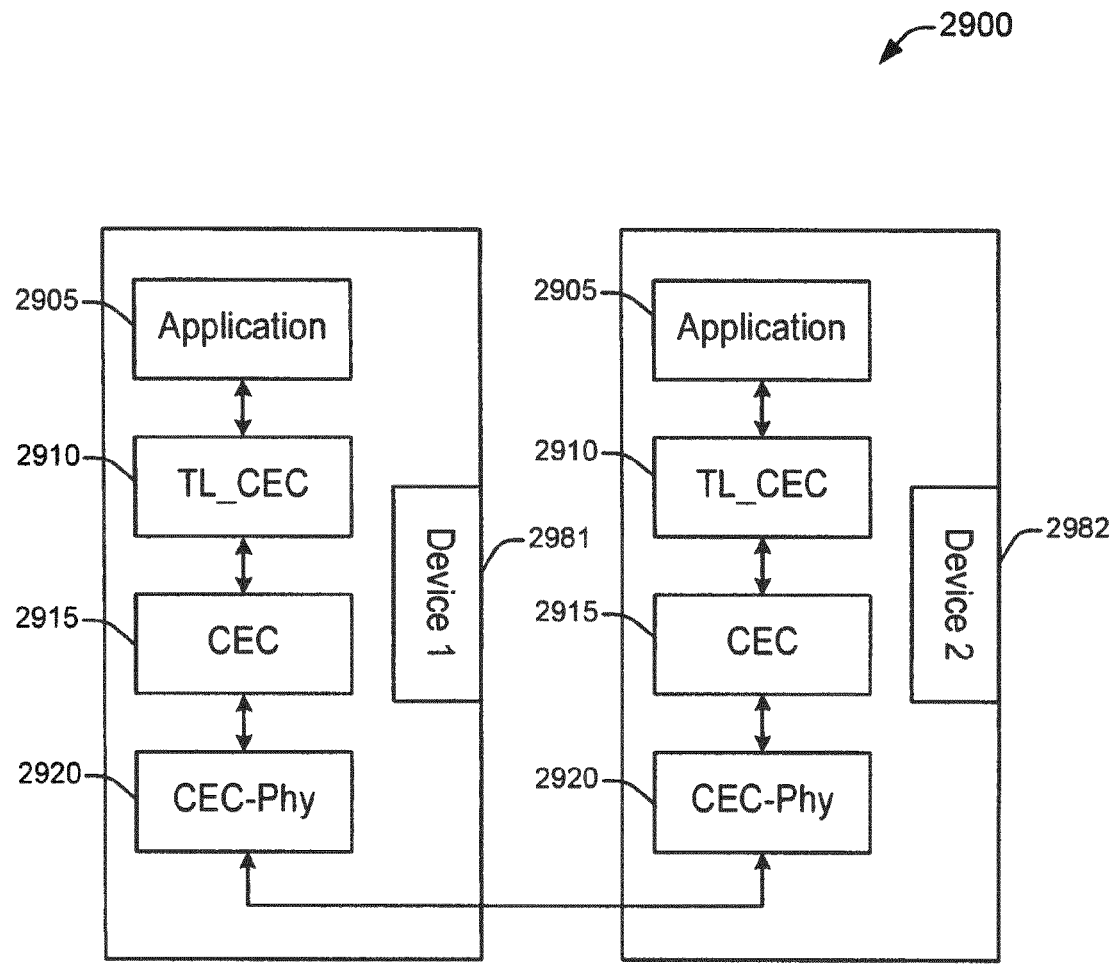
FIG. 29 depicts an exemplary network layer model 2900 for use with the consumer electronic control bus, in accordance with an embodiment of the present invention.

FIG. 29 depicts an exemplary network layer model 2900 for use with the consumer electronic control (CEC) bus, in accordance with an embodiment of the present invention. The network layer model 2900 includes an application layer 2905, a TL_CEC layer 2910, a CEC layer 2915, and a CEC-physical layer (CEC-phys) 2920, where communication between a first device (device 1) 2981 and a second device (device 2) 2982 being performed at the CEC physical layer (CEC-phys) 2920.

Figure 30:
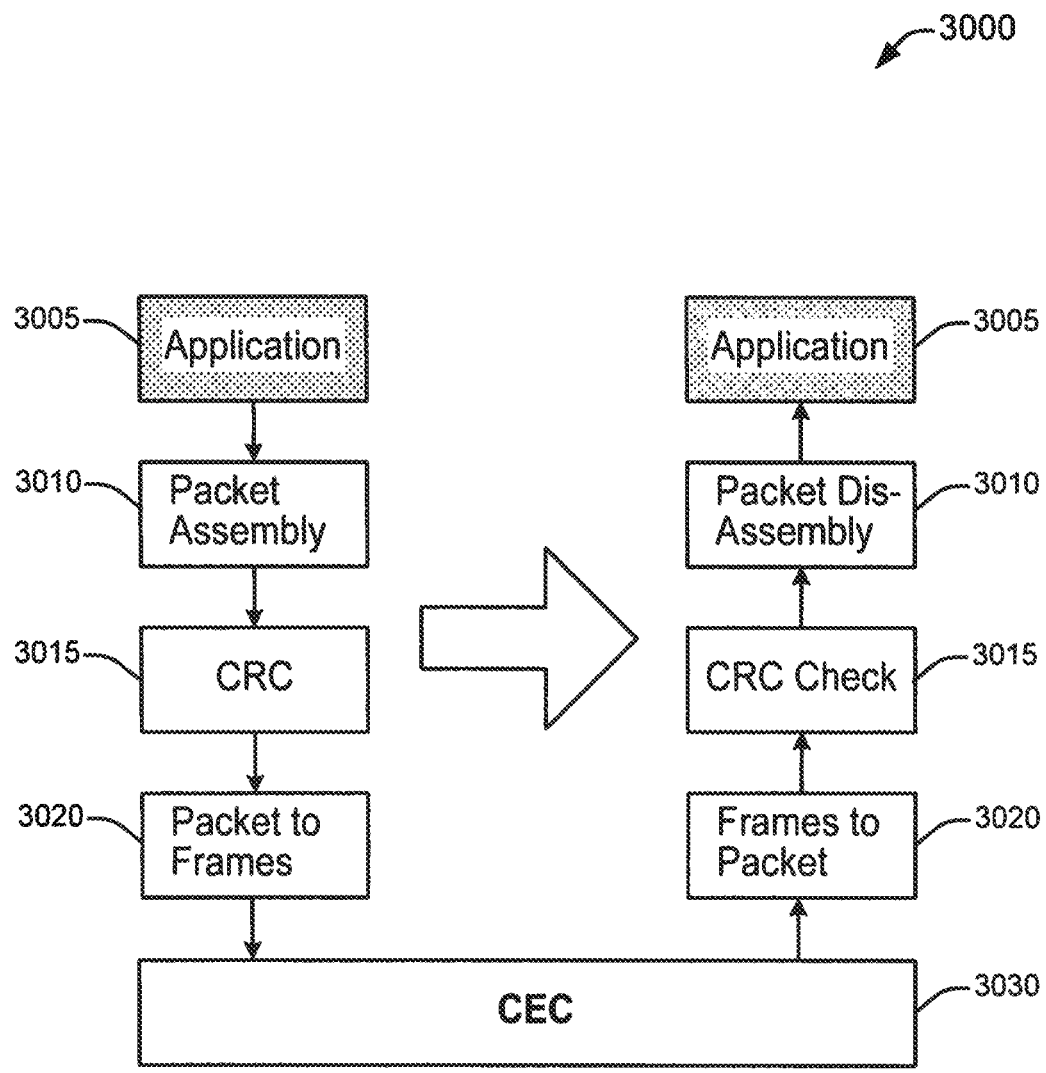
FIG. 30 depicts a high level diagram of exemplary CEC processing 3000 to provide an application to application communication with CEC vendor specific commands, in accordance with an embodiment of the present invention.

FIG. 30 depicts a high level diagram of exemplary CEC processing 3000 to provide an application to application communication with CEC vendor specific commands, in accordance with an embodiment of the present invention. That is, with respect to CEC processing 3000, Look Data Elementary Messages are generated by a generation application 3005 in content creation/authoring. The Look Data Elementary Messages are then assembled to become a look data packet by a packet assembly block 3010. A cyclic redundancy code (CRC) is calculated from this packet by a CRC block 3015, in an HDMI defined way. The CRC here is implemented as a checksum, which is defined to be the byte-wide sum of all packet data, including header, plus the checksum data, to be equal zero.

Subsequently, the CRC and the look data packet are split into frames of appropriate size for communication by a packet to frames block 3020. In an embodiment of the present invention, a packet size of 88 bytes can be used as an example. In such an embodiment, the first CEC message carries 8 bit of CRC data, and the following messages can then carry 8 bits more payload data since the CRC data needs to be communicated only once per Look Data Packet.

Figure 31:
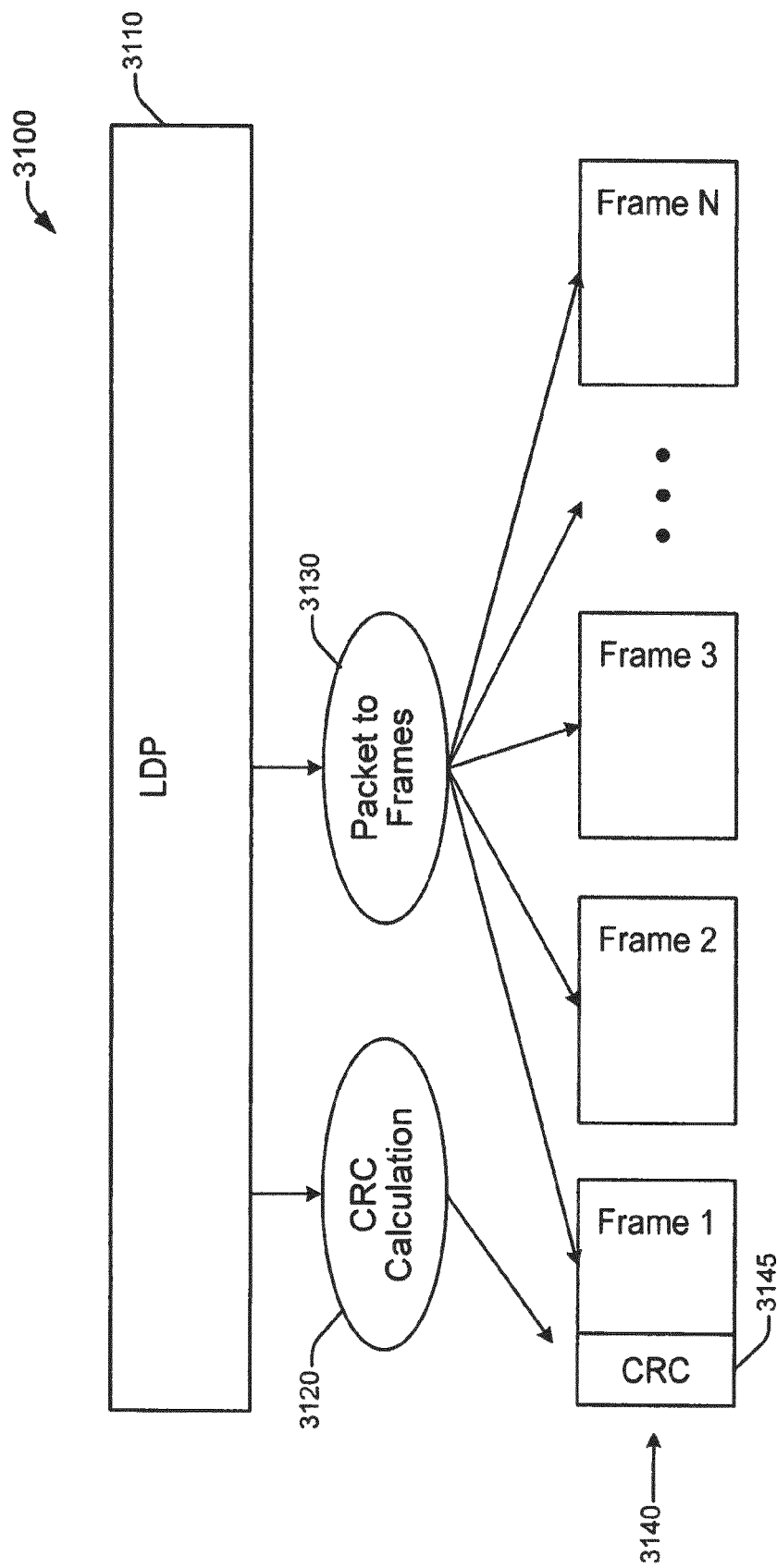
FIG. 31 depicts a high level block diagram illustrating an exemplary conversion 3100 of look data packets into frames for transmission using HDMI, in accordance with an embodiment of the present invention.

Alternatively and as depicted in FIG. 31, the CRC data can also be transmitted at the end of the transmission, in frame N. That is, FIG. 31 depicts a high level block diagram illustrating an exemplary conversion 3100 of look data packets into frames for transmission using HDMI. Afterwards and referring back to FIG. 30, the data is ready for transmission via CEC 3030.

In one embodiment of the present invention, on a reception side, the exact opposite is done. That is, the frames are reassembled to become a look data packet, the checksum is calculated, and then the Look Data Elementary Messages are disassembled from the look data packet to feed the application on the reception side, which typically is a display that now changes the look according to the intent specified by the content creator.

It should be noted that the CRC block 3015 is part of the network layer 2900. In the case of a CRC error, either of the following two exemplary approaches can be performed, although it should be noted that the principles of the present invention are not limited to solely the following described approaches. In a first approach, the look data packet can be discarded. In a second approach, a re-transmission request can be issued. In the case of the first approach, the previously transmitted packet would stay valid.

Referring back to FIG. 31, FIG. 31 depicts a high level block diagram illustrating an exemplary conversion 3100 of look data packets into frames for transmission using HDMI, in accordance with an embodiment of the present invention. The conversion 3100 involves a given look data packet 3110, and the application of a CRC calculation 3120 and a packet to frames conversion 3130 to obtain the resultant frames 3140, with the first frame having CRC information 3145 therein.

As opposed to some of the previously mentioned methods, CEC does not have a common time base with the video signal. Therefore, in an embodiment of the present invention to synchronize a look data packet, a validation signal at the end of a LDP transmission is used, in order to time the loading of the parameters and data of the transmitted LDP into the video processing blocks of the sink device. As such, a look data packet gets transmitted over CEC and stays invalid until a special "Validate" CEC command is transmitted.

However, the validation cannot be exactly timed. As such in one embodiment of the present invention, one possibility is to estimate the uncertainty of application time, and ensure that the change in video processing is not disturbed. Scene change blanking can be used. The "Validate" signal can be as short as 1 byte, but with CEC bits overhead it will add up to a minimum of 60 bits plus start bit, as shown in FIG. 32. That is, FIG. 32 depicts an exemplary Look Data Elementary Message 3200 for look data validation, in accordance with an embodiment of the present invention.

Therefore, the transmit time can be calculated by: CEC Starttime+20×CEC nominal data bit period. HDMI Specification Version 1.3a suggests a nominal CEC Start Time of 4.5 milliseconds, and a nominal CEC Data Period time of 2.4 milliseconds. This results in 4.5 milliseconds+60×2.4 milliseconds=148.5 milliseconds. Therefore, the "Validate" signal will have a field delay of 9 for 60 Hz, or 8 for 50 Hz, or 4 for 24 Hz. However, this may change with newer versions of the CEC specification in the HDMI specification.

As such, the "Validate" command has to be requested from a CEC generator at least 9 fields prior to application in case of a field frequency of 60 Hz. Since the HDMI sink control is over both video and CEC, in order to avoid the wrong LDP data being applied to a given picture content, it is proposed that the picture content gets blanked or otherwise made not vulnerable to LDP changes during the transition phase. The transition phase is determined to be the time duration between the transmission time assuming the fastest possible CEC transition speed by means of the HDMI specification, and the slowest CEC transmission, plus possible processing delay in the sink.

In order to overcome the synchronization problem of scene based look data packet changes, the following exemplary method is proposed, in accordance with an embodiment of the present invention. That is, to synchronize CEC with video, a physical level CEC action is performed. This can be accomplished, for example, by an apparatus depicted in FIG. 33.

Figure 33:
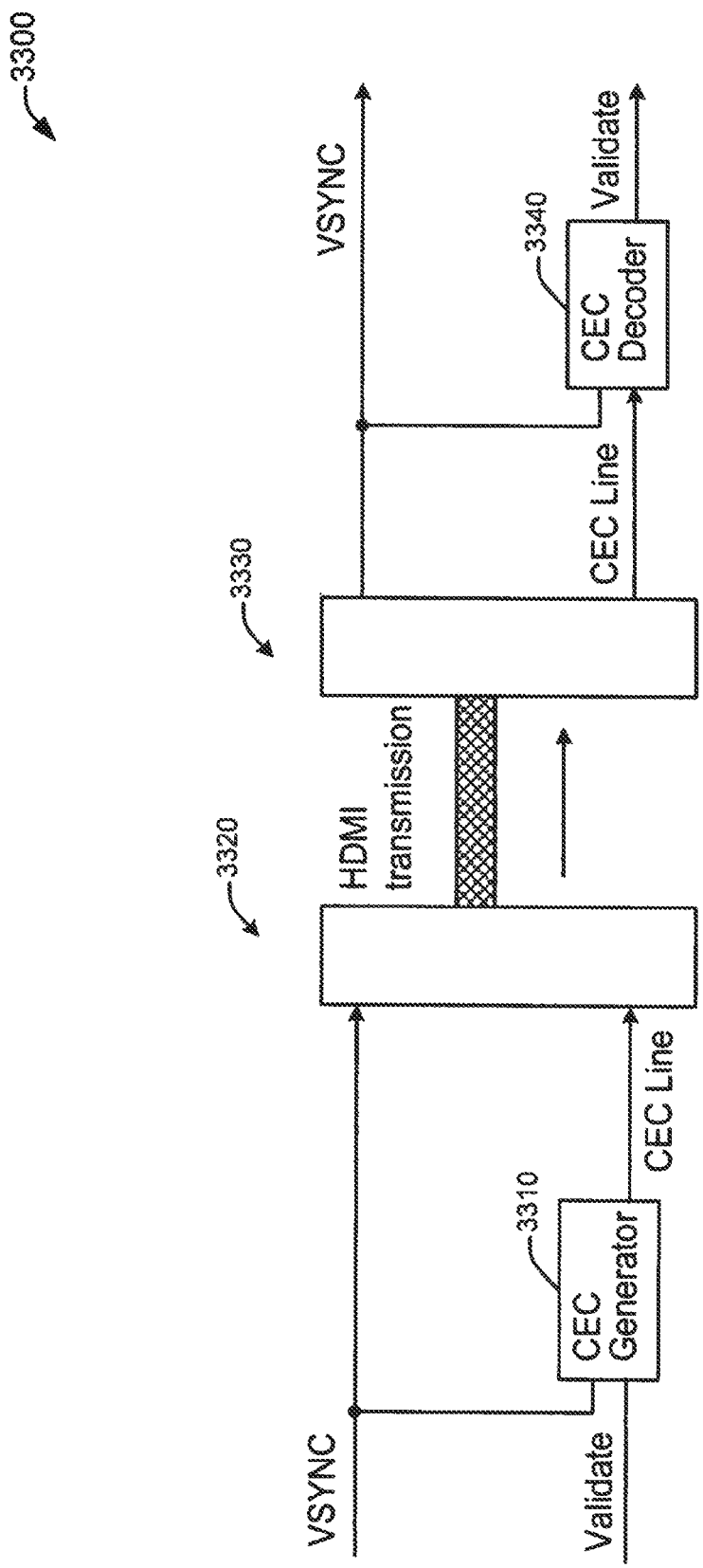
FIG. 33 depicts an exemplary apparatus 3300 for generating a CEC validate signal, in accordance with an embodiment of the present invention.

More specifically, FIG. 33 depicts an exemplary apparatus 3300 for generating a CEC validate signal, in accordance with an embodiment of the present invention. The apparatus 3300 of FIG. 33 illustratively comprises a CEC generator 3310, a transmitter side 3320, a receiver side 3330, and a CEC decoder 3340. A physical level CEC action is performed by apparatus 3300 that, on the transmitter side 3320, synchronizes PHY layer actions of the CEC with the VSYNC (vertical synchronization signal) of the video part. On the receiver side 3330, the apparatus synchronizes the application of look data packet data to the picture processing in a frame synchronous way by synchronizing the look data packet data application with CEC physical layer actions. The apparatus 3300 achieves this by timing the CEC Validate command with VSYNC, awaiting the EOM command of the last byte for look data packet data validation.

Figure 34:
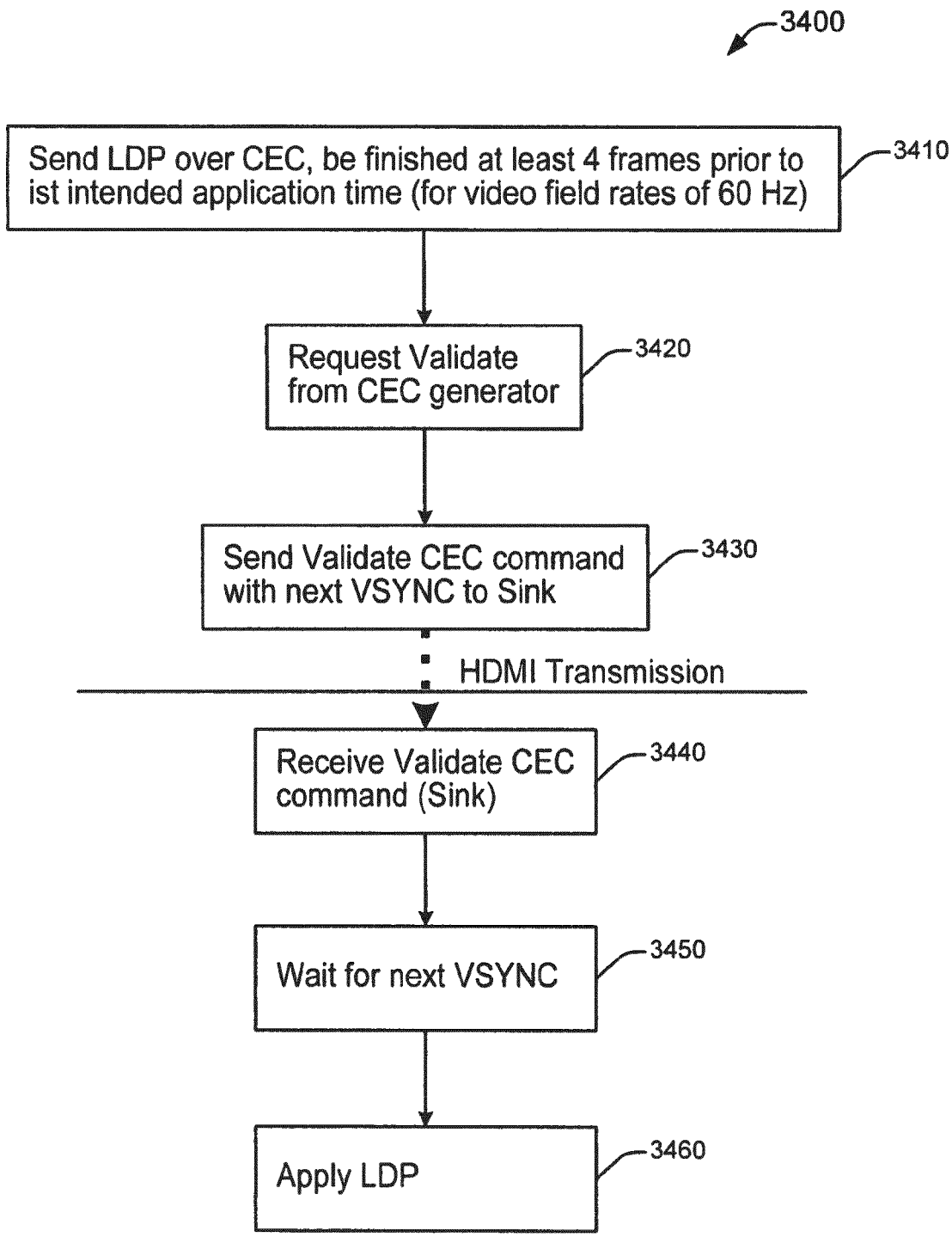
FIG. 34 depicts a flow diagram of a method for a validate signal transmission in CEC, in accordance with an embodiment of the present invention.

FIG. 34 depicts a flow diagram of a method for a validate signal transmission in CEC, in accordance with an embodiment of the present invention. The method 3400 begins at step 3410 at which the LDP is transmitted to the sink. The method 3400 then proceeds to step 3420.

At step 3420, a "Validate" signal transmission is requested from the CEC generator in the source device in block 3420. The method 3400 then proceeds to step 3430.

At step 3430, the CEC generator starts transmitting the CEC "Validate" command, starting at the next VSYNC event. The method 3400 then proceeds to step 3440.

At step 3440, the sink receives the "Validate" signal. The method 3400 then proceeds to step 3450.

At step 3450, the sink waits until the transmission is finished and with the next following VSYNC signal event in the sink device, it validates the LDP data. The method 3400 then proceeds to step 3460.

At step 3460, the sink device applies the LDP data content to the video processing blocks. The method 3400 can then be exited.

As mentioned above, the transmission time of a "Validate" signal will be approximately 52.5 milliseconds. Therefore, the "Validate" signal will have a field delay of 4 for 60 Hz, of 3 for 50 Hz and for 24 Hz. Therefore, it is necessary to have the LDP transmission finished and the "Validate" signal transmission initiated approximately 4 frames prior to its application. There will then be no uncertainty of LDP application.

In an alternate embodiment of the present invention, another transmission method can include using novel, future networking possibilities for LDP transmission. For example, HDMI may adopt a new networking channel on a top layer/level in the future, or replace some of the existing HDMI-specific data transmission possibilities. This new transmission method may be based on known networking technology, and may be asynchronous to video. This networking technology can be used to transmit the LDP packets the same way, and to use the methods of CEC transmission, such as video synchronization, and packet control described in conjunction with the various embodiments of the present invention described herein.

Having described preferred embodiments for a method and system for look data definition and transmission over HDMI (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method, comprising:
   generating metadata for video content, the metadata for altering the video content before display thereof by accounting for variations between different display devices and variations between different creative intents by a content creator; and
   preparing the video content and the metadata for transmission over a high definition multimedia interface using a gamut profile of a gamut boundary description metadata container to convey the metadata for altering the video content.

2. The method of claim 1, further comprising transmitting the metadata and the video content over the high definition multimedia interface, such that the metadata is available to alter the video content before the display thereof.

3. The method of claim 1, wherein the metadata is prepared for the transmission at least one of in-band and out-of-band with respect to the video content.

4. The method of claim 1, wherein the metadata is prepared for the transmission using at least one of a new gamut profile and an unused gamut profile of a gamut boundary description metadata container with respect to version 1.3A and any earlier versions of the High Definition Multimedia Interface Specification.

5. The method of claim 1, wherein the metadata is prepared for the transmission using a vendor specified information frame.

6. The method of claim 5, wherein said preparing step comprises applying gamut boundary description flow control to the vendor specified information frame.

7. The method of claim 1, wherein the metadata is prepared for the transmission using a high definition multimedia interface consumer electronics control protocol.

8. The method of claim 7, wherein said preparing step comprises at least one of adding a network abstraction layer on top of the consumer electronics control protocol and enabling quality of service.

9. The method of claim 7, wherein said preparing step comprises timing the consumer electronics control protocol to the video content including coupling the consumer electronics control protocol with a vertical synchronization signal.

10. The method of claim 1, wherein the metadata is for at least one of color manipulation of the video content, controlling spatial filtering of the video content to change a modulation transfer function associated therewith, controlling a motion behavior of the video content, controlling a film grain aspect of the video content, adding noise to the video content, controlling an editorial of a scene in the video content, and tone mapping with respect to the video content.

11. The method of claim 10, wherein the metadata corresponds to at least one of one or more look up tables and one or more color transform matrices.

12. The method of claim 1, wherein said preparing step comprises organizing the metadata into a packet.

13. The method of claim 12, further comprising generating at least one message for inserting in the packet, the at least one message relating to at least one of color manipulation of the video content, controlling spatial filtering of the video content to change a modulation transfer function associated therewith, controlling a motion behavior of the video content, controlling a film grain aspect of the video content, adding noise to the video content, controlling an editorial of a scene in the video content, and tone mapping with respect to the video content.

14. The method of claim 1, further comprising storing the video content and the metadata on a disk for subsequent display of the video content modified in accordance with the metadata.

15. A system, comprising:
   a metadata generator for generating metadata for video content, the metadata for altering the video content before display thereof by accounting for variations between different display devices and variations between different creative intents by a content creator; and
   a metadata transmission preparation device for preparing the video content and the metadata for transmission over a high definition multimedia interface using a gamut profile of a gamut boundary description metadata container to convey the metadata for altering the video content.

16. The system of claim 15, further comprising a high definition multimedia interface transmission device for transmitting the metadata and the video content over the high definition multimedia interface, such that the metadata is available to alter the video content before the display thereof.

17. The system of claim 15, wherein the metadata is prepared for the transmission at least one of in-band and out-of-band with respect to the video content.

18. The system of claim 15, wherein the metadata is prepared for the transmission using at least one of a new gamut profile and an unused gamut profile of a gamut boundary description metadata container with respect to version 1.3A and any earlier versions of the High Definition Multimedia Interface Specification.

19. The system of claim 15, wherein the metadata is prepared for the transmission using a vendor specified information frame.

20. The system of claim 19, wherein gamut boundary description flow control is applied to the vendor specified information frame.

21. The system of claim 15, wherein the metadata is prepared for the transmission using a high definition multimedia interface consumer electronics control protocol.

22. The system of claim 21, wherein said metadata transmission preparation device at least one of adds a network abstraction layer on top of the consumer electronics control protocol and enables quality of service.

23. The system of claim 22, wherein said metadata transmission preparation device times the consumer electronics control protocol to the video content including coupling the consumer electronics control protocol with a vertical synchronization signal.

24. The system of claim 15, wherein the metadata is for at least one of color manipulation of the video content, controlling spatial filtering of the video content to change a modulation transfer function associated therewith, controlling a motion behavior of the video content, controlling a film grain aspect of the video content, adding noise to the video content, controlling an editorial of a scene in the video content, and tone mapping with respect to the video content.

25. The system of claim 24, wherein the metadata corresponds to at least one of one or more look up tables and one or more color transform matrices.

26. The system of claim 15, wherein the metadata is organized into a packet.

27. The system of claim 26, wherein the packet comprises at least one message relating to at least one of color manipulation of the video content, controlling spatial filtering of the video content to change a modulation transfer function associated therewith, controlling a motion behavior of the video content, controlling a film grain aspect of the video content, adding noise to the video content, controlling an editorial of a scene in the video content, and tone mapping with respect to the video content.

28. The system of claim 15, further comprising a storage device for storing the video content and the metadata on a disk for subsequent display of the video content modified in accordance with the metadata.

* * * * *